(12) United States Patent
Wind

(10) Patent No.: US 6,515,251 B1
(45) Date of Patent: Feb. 4, 2003

(54) WELDING SYSTEM AND METHOD

(75) Inventor: Michael W. Wind, Jenison, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/702,339

(22) Filed: Oct. 31, 2000

(51) Int. Cl.⁷ .......... B23K 11/11; B23K 11/30; B32B 15/01
(52) U.S. Cl. ........ 219/86.1; 219/91.1; 219/91.2; 219/110; 219/119; 428/594
(58) Field of Search .............. 219/78.01, 80, 219/84, 86.1, 91.1, 91.2, 110, 117.1, 119, 86.8, 86.9; 29/91–91.8; 403/DIG. 11, DIG. 12, DIG. 13; 428/544, 594

(56) References Cited

U.S. PATENT DOCUMENTS

| | | | |
|---|---|---|---|
| 1,635,583 A | * 7/1927 | Meadowcroft | |
| 1,645,710 A | * 10/1927 | Meadowcroft | |
| 1,794,789 A | * 3/1931 | Meadowcroft | |
| 2,009,647 A | * 7/1935 | Brusse et al. | |
| 2,419,817 A | * 4/1947 | Bruno | |
| 2,438,262 A | * 3/1948 | Watkin | |
| 3,313,909 A | * 4/1967 | Mathews | |
| 3,731,046 A | * 5/1973 | Brems | 219/119 |
| 3,791,850 A | * 2/1974 | Deshay et al. | 117/75 |
| 3,936,656 A | * 2/1976 | Middleton et al. | 219/118 |
| 4,208,568 A | * 6/1980 | Bakewicz et al. | 219/119 |
| 4,341,940 A | 7/1982 | Defourny | 219/117.1 |
| 4,380,174 A | * 4/1983 | Tanenbaum | 73/842 |
| 4,395,615 A | * 7/1983 | Tanenbaum | 219/111 |
| 4,408,115 A | * 10/1983 | Tanenbaum | 219/108 |
| 4,419,558 A | 12/1983 | Stiebel | 219/109 |
| 4,421,969 A | * 12/1983 | Tanenbaum | 219/107 |
| 4,447,700 A | 5/1984 | Cohen | 219/117.1 |
| 4,472,620 A | 9/1984 | Nied | 219/120 |
| 4,711,984 A | 12/1987 | Bilge et al. | 219/110 |
| 4,734,555 A | * 3/1988 | Ferguson | 219/109 |
| 5,111,020 A | 5/1992 | Stiebel | 219/110 |

(List continued on next page.)

OTHER PUBLICATIONS

US 2001/0045447 A1 Kano et al. (Nov. 29, 2001).*
Miyachi, "DC Tech Series Inverter Power Supplies For Resistance Welding Applications," bearing designations of "Copyright 1999" and "993–008 Apr. 1999."

(List continued on next page.)

Primary Examiner—M. Alexandra Elve
Assistant Examiner—Kiley Stoner
(74) Attorney, Agent, or Firm—Foley & Lardner

(57) ABSTRACT

A method of resistance spot welding is disclosed. The method includes providing a first metallic workpiece having a primary surface and a second metallic workpiece having a secondary surface. The method also includes positioning the primary surface into physical contact with a first electrode and a second electrode into physical contact with the secondary surface. The second electrode includes a secondary actuator. The method also includes measuring contact force between the first electrode and the second electrode, and initiating a current through the first electrode when the contact force reaches a preselected force value. The method also includes forming a weld nugget in at least the second workpiece and a depression in the primary surface of the first workpiece, and controlling the location of the weld nugget by using two different classes of electrodes. The depression in the primary surface is substantially undetectable by a visual examination. A resistance spot welding system is also disclosed. The system includes a fast follow-up electrode of one RWMA class mounted to one end of a pivot arm for squeezing a primary workpiece and a secondary workpiece together and for following the surface of the secondary workpiece as the weld is formed. A stationary electrode of another RWMA class is positioned opposite the fast follow-up electrode. A sensor is coupled to the stationary electrode for directly measuring the contact force between the fast follow-up electrode and the stationary electrode. A measuring instrument for measuring a depression formed in the primary surface.

46 Claims, 16 Drawing Sheets

U.S. PATENT DOCUMENTS

| | | | | |
|---|---|---|---|---|
| 5,115,113 | A | | 5/1992 | Miller .......................... 219/89 |
| 5,254,828 | A | | 10/1993 | Stiebel ........................ 219/110 |
| 5,484,975 | A | | 1/1996 | Itatsu ......................... 219/86.7 |
| 5,753,884 | A | * | 5/1998 | Hilgenfeldt et al. ..... 219/117.1 |
| 5,866,866 | A | * | 2/1999 | Shimada ..................... 219/110 |
| 5,883,355 | A | | 3/1999 | Kaneshima .............. 219/86.51 |
| 5,906,755 | A | | 5/1999 | Arasuna et al. .......... 219/86.41 |
| 6,225,590 | B1 | * | 5/2001 | Farrow .................... 219/86.41 |
| 6,342,686 | B1 | * | 1/2002 | Farrow ...................... 219/109 |

OTHER PUBLICATIONS

Sensotec, Sales materials for "WeldMeter Instrumentation" and "WeldThru™ Sensor," bearing a designation of "Copyright 1999."

CMW Inc., "Resistance Welding Products," p. 40, bearing a designation of "Copyright CMW Inc., 1990, 1993, 1996."

Tipaloy Inc., Sales materials, pp. 1 and 39, bearing a designation of "1997A."

Sensotec, "2000 Full Catalog," excerpts, bearing a designation of "Copyright 2000."

Resistance Welder Manufacturers' Association, "Resistance Welding Manual," excerpts, bearing a designation "©1989".

Miyachi, "Product Guide," bearing a designation "993–001 Apr. 1995".

Sensotec, "Automotive," bearing a designation "Copyright© 1996".

Miyachi, "Resistance Fine Spot Welding Applications No. 1," bearing a designation "993–033 Jan. 1997 Copyright 1997".

Miyachi, "Mid Frequency Inverter Power Supplies for Resistance Welding," bearing a designation "Copyright© 1997".

Miyachi, Mid–Frequency Inverter Systems Address Resistance Welding Challenges, Jun. 1998.

Miyachi, "Connections," Feb. 1999.

Unitek Equipment, "Fundamentals of Small Parts Resistance Welding," bearing designations "991–140 Aug. 1999" and "Copyright© 1999".

Tufaloy, "Catalog 980" bearing a designation "798 Litho in USA".

Taylor–Winfield Corp., "Excellence in Design, Engineering, & Manufacturing," undated.

* cited by examiner

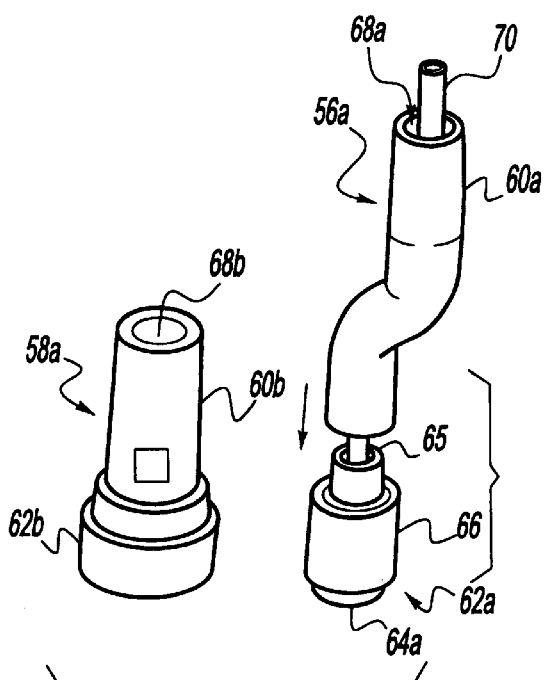
FIG. 10
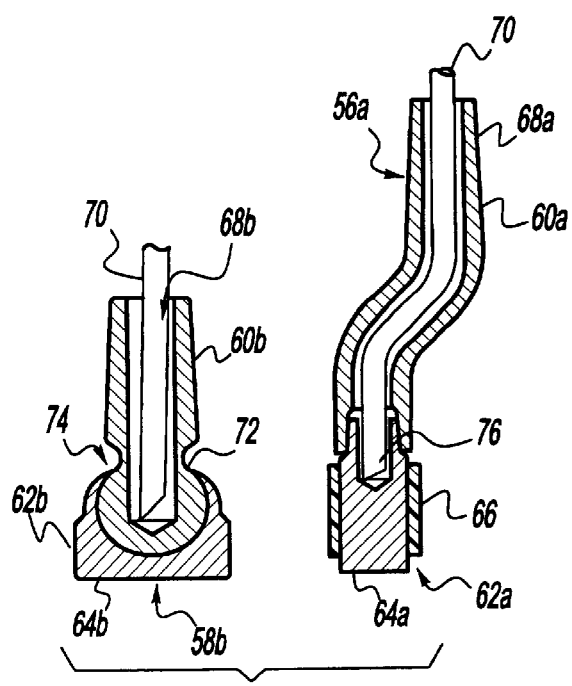
FIG. 11
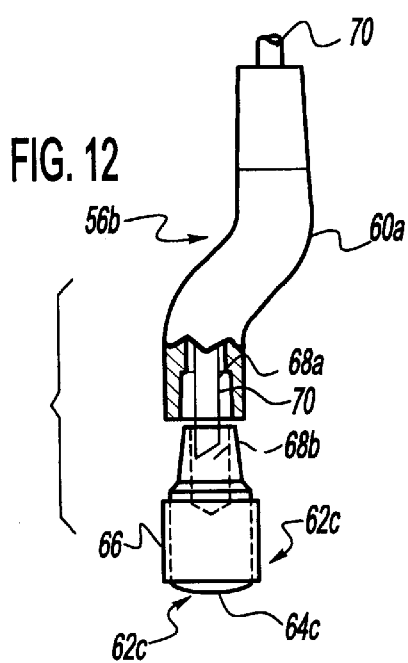
FIG. 12
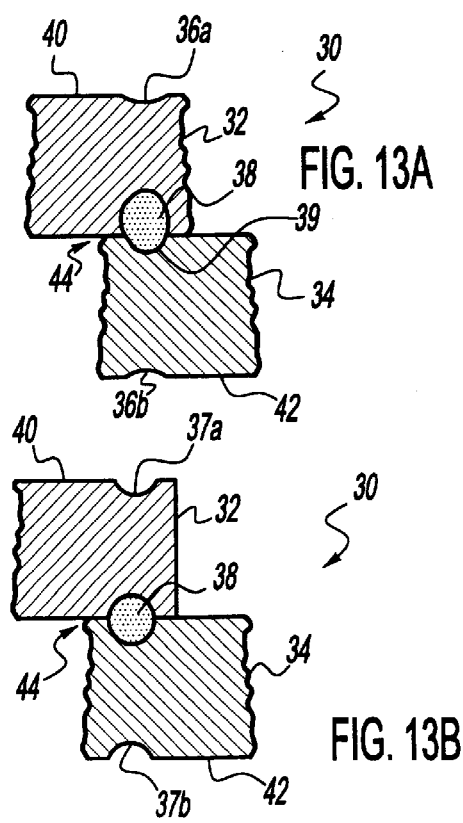
FIG. 13A
FIG. 13B

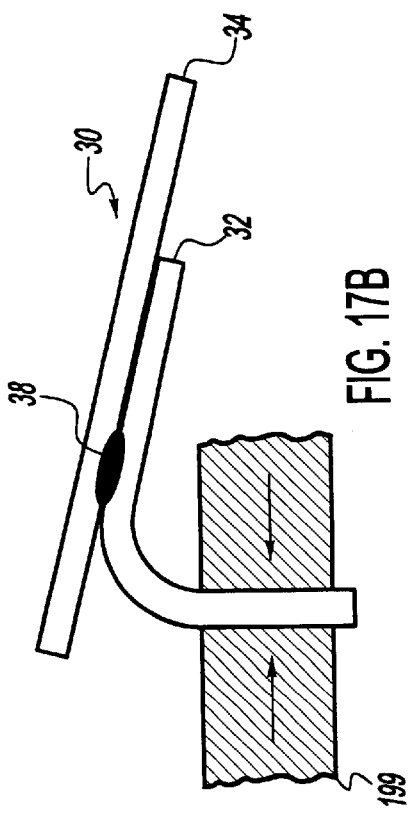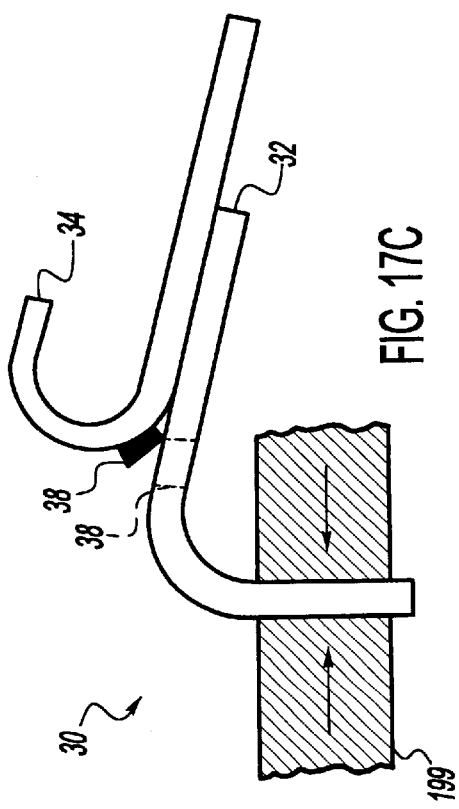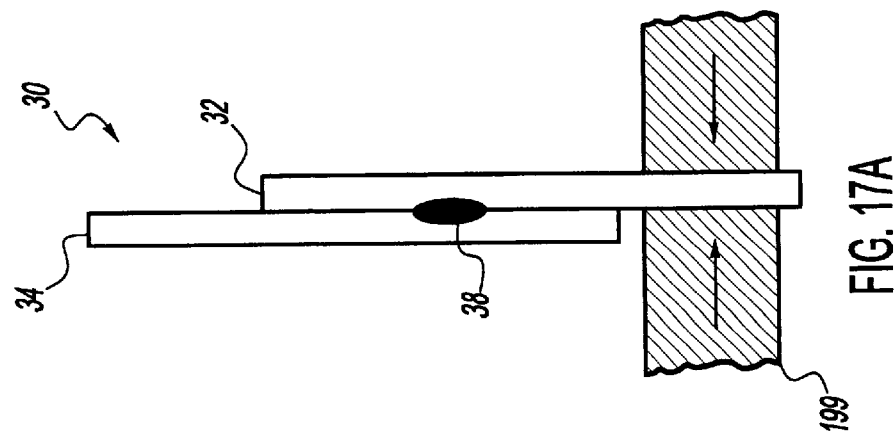

WELDING SYSTEM AND METHOD

FIELD OF THE INVENTION

The present invention generally relates to a welding system. The present invention more particularly relates to a welding system for producing a spot weld.

BACKGROUND

It is generally known to resistance weld metallic workpieces together using an electric current. Specific applications of resistance welding include spot welding, seam welding, projection welding, and butt welding. In general, resistance welding involves squeezing the workpieces between a pair of electrodes for a set period of time (i.e., the "squeeze" time), and locally heating the workpieces by supplying an electric current until a molten pool of material from the workpieces forms at an interface between the workpieces. The current may be turned off and the workpieces are allowed to cool so that the pool solidifies to form a weld nugget at the interface to attach the two workpieces together.

Electrodes are typically used to conduct the electric current through the workpieces. The heat generated in the welding system depends, at least in part, on the electrical resistance and thermal conductivity of the workpieces, the amount of force applied to the workpieces, the amount of current supplied, and the period of time that the force is applied and the current is supplied.

During the welding operation, formation of the molten pool tends to form a surface defect (e.g., bump, depression, indentation, depression, dimple, etc.) in the surface of the workpieces. The surface defect is caused by pressure and current being applied to the workpieces by the electrodes. As the surface defect is formed, the contact between the electrodes and the workpieces may decrease. One problem with known welding systems can be that molten "expulsion" or "weld splash" may occur as the depression is formed if the force applied to the workpieces is too low, with a given current. Another problem with known welding systems can be that the defect is visible in the finished product even if later painted.

In order to overcome such problems, during the welding operation the force initially applied to the workpieces may be increased so that even after the depression forms, there is a sufficient amount of force being applied to the workpieces. However, such methods of compensating for the anticipated decreased applied force and contact between the electrode(s) and the workpieces does not necessarily render the defect perceptibly not visible. Also, such a defect may result in additional steps in the manufacturing process (e.g., filling, sanding, application of a coating, etc.) to obscure the defect, or may result in special design to hide the defect from view. In order to further overcome the problem of a surface defect, some have attempted to obscure the depression by filling it with multiple layers of paint or by designing the article so that the welded workpieces are hidden from view, which may add additional manufacturing steps and material costs.

Accordingly, it would be advantageous to provide a resistance welding system that produces a workpiece having a depression of a generally reduced depth. It would also be advantageous to reduce the depth and size of the depression to eliminate additional processing steps such as sanding, grinding, refurbishing, or applying multiple layers of a coating. It would also be advantageous to provide a resistance spot welding process for forming a spot weld that does not substantially "show" on the visible side of a welded article. It would also be advantageous to provide a resistance welding system that produces a workpiece that does not necessarily require obfuscation such positioning the weld marks out of view by the customer.

It would be desirable to provide a welding system with or providing any one or more of these or other advantageous features.

SUMMARY OF THE INVENTION

The present invention relates to a method of resistance spot welding. The method includes providing a first metallic workpiece having a primary surface and a second metallic workpiece having a secondary surface, the first workpiece and the second workpiece each substantially free of a welding projection; positioning the primary surface into physical contact with a first electrode and a second electrode into physical contact with the secondary surface, wherein the second electrode includes a secondary actuator; measuring contact force between the first electrode and the second electrode; initiating a current through the first electrode when the contact force reaches a preselected force value; forming a weld nugget in at least the second workpiece and a depression in the primary surface of the first workpiece; and controlling the location of the weld nugget by using two different classes of electrodes. The depression in the primary surface is substantially undetectable by a visual examination.

The present invention also relates to a method of resistance spot welding. The method includes providing a first metallic workpiece having a primary surface in a facing relationship to a second metallic workpiece having a secondary surface, the first workpiece and the second workpiece each substantially free of a welding projection; positioning the primary surface into physical contact with a first electrode; positioning a second electrode into physical contact with the primary surface, the second electrode including a fast follow-up cylinder; measuring contact force between the first electrode and the second electrode with a sensor; initiating a current through the first electrode on reaching a preselected contact force; forming a weld nugget in at least the second workpiece; controlling the growth of the heat affected zone by using at least two different classes of electrode material; measuring a depression formed in the primary surface by visually determining whether the depression is substantially visible to the unaided eye from a distance; and conducting a quality control test on the depression formed in the primary surface.

The present invention further relates to a method of resistance spot welding. The method includes providing a first metallic workpiece having a primary surface in an abutting relationship to a second metallic workpiece having a secondary surface, the first workpiece and the second workpiece each substantially free of a welding projection; positioning the primary surface into physical contact with a first electrode; positioning a second electrode into physical contact with the secondary surface, the second electrode coupled to a fast follow-up cylinder; directly measuring with a pressure sensor a signal representative of a contact force between the second electrode and the first electrode; initiating a direct current through the electrode on reaching a preselected contact force; forming a weld nugget in the first and second workpieces; controlling the growth of the heat affected zone; measuring a depression formed in the primary surface having a lesser depth than a depression formed in the secondary surface wherein the depression in the primary surface is less than about −0.0008 inches in depth; and conducting a quality control test on the depression formed in the primary surface.

The present invention further relates to an article of furniture including a metallic primary surface having a depression that is not substantially visible to the unaided eye and a metallic secondary surface having a depression, wherein a weld nugget provides a structural attachment of the primary surface to the secondary surface capable of bearing a relatively significant load. The article of furniture is produced by a process of resistance spot welding, which includes positioning the primary surface into physical contact with a stationary electrode of a second class; positioning a fast follow-up electrode of a first class into physical contact with the secondary surface; directly measuring with a sensor a signal representative of a contact force between the fast follow-up electrode and the secondary surface; initiating a direct current through the fast follow-up electrode on reaching a preselected contact force; forming a weld nugget in at least the first workpiece; controlling the location of the weld nugget by using at least two different classes of electrodes.

The present invention further relates to a resistance spot welding system. The system includes a fast follow-up electrode of one RWMA class mounted to one end of a pivot arm for squeezing a primary workpiece and a secondary workpiece together and for following the surface of the secondary workpiece as the weld is formed. A stationary electrode of another RWMA class is positioned opposite the fast follow-up electrode. A sensor is coupled to the stationary electrode for directly measuring the contact force between the fast follow-up electrode and the stationary electrode. A measuring instrument for measuring a depression formed in the primary surface. The first workpiece and the second workpiece are each substantially free of a welding projection and the electrodes are configured for energizing the workpieces with a direct current.

The present invention further relates to a generally metallic primary surface and a generally metallic secondary surface produced by a processes of resistance spot welding. The process includes energizing the surfaces with a direct current; forming a weld nugget having a diameter of less than about 0.224 inch, thereby coupling the primary surface to the secondary surface; measuring a depression in the primary surface associated with the nugget; wherein the depression in the primary surface has a depth of less than about −0.0008 inch and is not substantially visible to the unaided eye from a distance of greater than about two feet after application of a coating layer of less than about 1.8 mil in thickness.

The invention as recited in the claims also relates to a generally metallic surface providing a concealed surface and a primary surface and produced by a processes of resistance spot welding.

BRIEF DESCRIPTION OF THE FIGURES

FIG. 10 is a fragmentary perspective view of electrodes and shank for the resistance welding system of FIG. 5 according to a preferred embodiment.

FIG. 11 is a fragmentary sectional view of the electrodes and shank of FIG. 10.

FIG. 12 is a fragmentary sectional view of an electrode and shank according to an alternative embodiment.

FIG. 13A is a fragmentary sectional view of a weldment according to a preferred embodiment.

FIG. 13B is a fragmentary sectional view of the weldment according to an alternative embodiment.

FIGS. 17A through 17C are fragmentary sectional views of a weldment tested by a destructive peel test according to an exemplary embodiment.

DETAILED DESCRIPTION OF EXEMPLARY EMBODIMENTS

Figure 1:
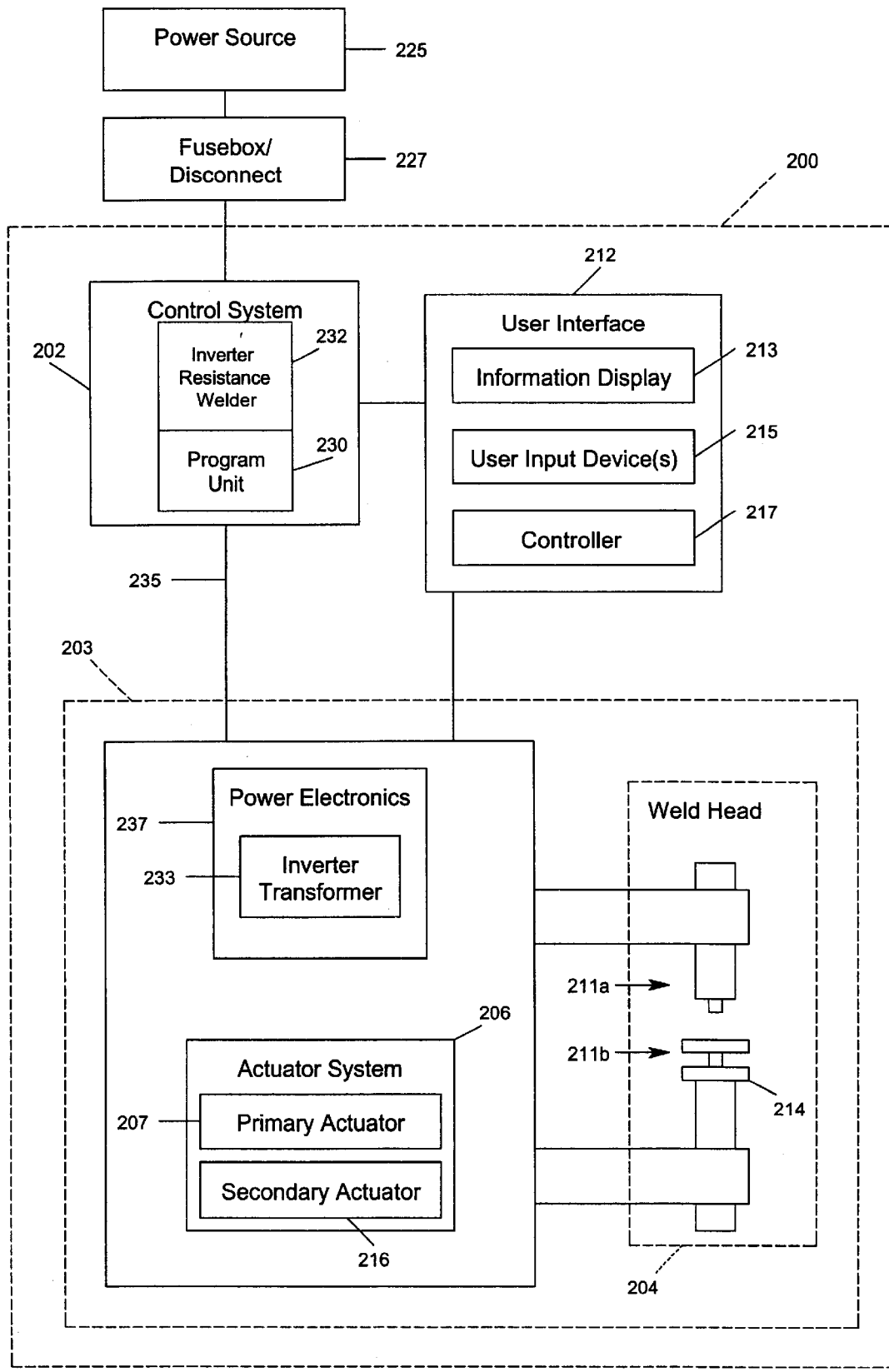
FIG. 1 is a block diagram of a welding system according to an exemplary embodiment.

FIG. 1 shows a schematic representation of a welding system 200, which is configured to create a weldment 30 (as shown in FIG. 13A) during a welding operation. During creation of weldment 30, a surface defect may be formed on a primary workpiece. The surface defect may be any of a variety of indicia or marks that results from the welding operation (e.g., depression, concave contour, convex contour, divot, well, dimple, bump, etc.). According to a preferred embodiment, welding system 200 is configured to weld workpieces without leaving a surface defect on the primary surface that would be visible to a customer. According to an exemplary embodiment, welding system 200 is configured to form a surface defect that does not require additional steps (e.g., filling, sanding, applying concealment coverings, etc.) between the welding operation and application of a final coating (e.g., paint, powder, enamel, lacquer, film, etc.). As such, the surface defect is not substantially perceptible or visible to the naked eye after being covered with the final coating during a finishing operation.

As shown in FIG. 1, welding system 200 includes a user interface 212, a welding apparatus 203, and a control system 202. (Exemplary embodiments of welding system 200 are further illustrated in FIGS. 5–7.) User interface 212 may provide an information display 213 (e.g., a monitor, LCD, "green screen," analog gauges, etc.) for providing system information or error messages, etc., input devices 215 (e.g., palm button, mechanical foot pedal, electronic pedals, trigger, buttons, etc.), and a controller 217. According to alternative embodiments, the user interface may provide any of a variety of user control devices, system information displays, interface panel or box, or the like.

Welding apparatus 203 includes a weldhead 204, power electronics 237 (e.g., inverter transformer 233), an actuator system 206. Welding apparatus 203 may also include valves, manifolds, and other power transmission, pneumatic and/or hydraulic components (not shown). According to exemplary embodiments, any of a variety of welding structures capable of providing movement of one or more electrodes (e.g., rocker arm welder, C-frame welder, press welder, automatic welder, robotic welder, etc.) may be used as known to one of skill who reviews this disclosure.

Weldhead 204 is configured to pass current through workpieces 32, 34 by one or more electrodes (shown as an upper electrode 211a and a lower electrode 211b) based upon a signal from control system 202. Weldhead includes a sensor 214 (e.g., a pressure transducer, etc.) is configured to provide a signal to control system 202 that is representative of a force being applied to an area of workpieces 32, 34 by electrodes 211a, 211b. According to a preferred embodiment, sensor 214 is a pressure transducer disposed on lower electrode 211b. According to other alternative embodiments, a signal representative of the force being applied to the workpieces may be obtained from any of a wide variety of other sensor or sensing devices.

Actuator system 206 is configured to move electrodes 211a and/or 211b so that they apply a preselected amount of force (Fp) to workpieces 32, 34. According to a preferred embodiment, actuator system 206 may be located in weldhead near the electrodes. According to alternative embodiments, the actuator system may be located to any of a variety of locations in the welding system. Actuator system 206 includes a primary actuator 207 and a secondary actuator 216. Primary actuator 207 is configured to move electrodes 211a and/or 211b so that the preselected force (Fp) is applied to the workpieces. Primary actuator 207 may include any of a variety of devices or actuators configured to move the weldhead (e.g., a hydraulic cylinder, a pneumatic cylinder, a press, etc.) so that a force is applied to the workpieces. Secondary actuator 216 is configured to maintain contact between the electrodes and the workpieces and maintain the preselected force (Fp) during the welding operation as the weld nugget is formed. Secondary actuator 216 is any of a variety of fast activating actuators configured to provide fine increments of force and movement. According to a preferred embodiment, secondary actuator 216 may be a "fast follow-up" device such as a "fast follow-up" electrode, "fast follow-up" holder or a "fast follow-up" cylinder, or any of a variety of devices configured to apply a force. According to an exemplary embodiment, the secondary actuator could be a Model No. 18-1101, commercially available from CMW, Inc. of Indianapolis, Ind. According to an alternative embodiment, secondary actuator may include a biasing element (such as a spring) (not shown) biased for extension and retraction of the upper or lower electrode relative to the weldment (i.e., for fast follow-up action). According to alternative embodiments, the secondary actuator is any of a variety of devices configured to provide and to maintain contact and force between the electrodes and the workpieces.

Control system 202 is configured to provide independent regulation of welding parameters such as current and current time (e.g., current waveform), and hold time. A feedback loop 235, coupling welding apparatus 203 and control system 202, is provided for control system 202 to monitor welding parameters so that it may initiate the welding operation and make necessary adjustments to the parameters. According to a preferred embodiment, feedback loop 235 is a high-speed adaptive closed feedback loop and coupled to electrodes 211a and 211b.

Control system 202 includes an inverter resistance welder 232 and a program unit 230. According to a preferred embodiment a power source 225 provides current and voltage (e.g., as three phase AC) to control system 202. According to a preferred embodiment, inverter resistance welder 232 adjusts the secondary current output utilizing pulse width modulation (PWM) every 500 milliseconds ("ms") based on the preselected current settings. According to a preferred embodiment, power is delivered through a fuse box and disconnect 227 and is generated through inverter resistance welder 232 with an inverter transformer 233 rated at 60 kVA. Inverter transformer 233 provides a rectified DC current to the workpieces through the electrodes.

Inverter 232 may be a mid-frequency inverter resistance welder for delivering current of about 2000–80,000 amps at 600–1000 Hz. According to a particularly preferred embodiment, inverter 232 is a mid-frequency inverter resistance welder that delivers 600 Hz, 800 Hz, or 1000 Hz. According to another preferred embodiment, the inverter may be operated in either millisecond mode or cycle mode. According to a particularly preferred embodiment, the inverter is an IS-120A or ISA-500A model commercially available from Miyachi Corporation of Monrovia, Calif. and operated in the "millisecond" mode. According to alternative embodiments, other suitable inverters of any type may be included in the control system.

According to a preferred embodiment, controller 217 is a programmable logic controller (PLC) which directs or controls numerous input and/or output signals to control the welding operation. During the welding operation, the control program operates a series of routines, sub-programs, modules or steps, which may be implemented in a variety of sequences (e.g., "ladder logic) and/or with a variety of other inputs, outputs, steps or instructions according to alternative embodiments. According to a particularly preferred embodiment, the PLC controller is a SLC-503PLC commercially available from Allen Bradley Corporation of Milwaukee, Wis.

According to alternative embodiments, other suitable controllers of any type may be included in the user interface. Any of a variety of instrumentation or user interface (e.g., display screen, gauge, monitor, sensor, relay, touch-pad, or other indicators of any type, etc.) as well as other input devices (not shown) may also be coupled to the controller (e.g., PLC or the like). As will be apparent to those of skill who review this disclosure, the user interface and its controller may also have associated timing and/or control circuits activated by input devices, power sources, memory storage modules, heating and/or cooling systems, accessories, display systems and/or instrumentation (e.g., regulator, sensor for monitoring temperature, volume, pressure, current, time, or other parameters, etc.) and the like.

As one of ordinary skill in the art who has reviewed this disclosure would understand, the various threshold, start and preselected values and ranges, and system parameters may vary from one welding operation to the next according to various factors. The welding parameters may depend on the thickness of the workpieces, the size of the desired weld nugget, the resistance of the weld "circuit," etc. According to a preferred embodiment, the workpieces are 20 gauge (0.033 inch thickness) and arranged with contact overlap of about 7/16 inch or more and with a spacing of about ½ inch or more to form a weld having a diameter of about 0.100 inch to 0.150 inch. The preselected force (Fp), preselected current (Ip), weld time, and hold time may be determined by any number of methods, including calculation, experimentation, empirical analysis, reference chart, etc. According to a preferred embodiment, the weld program may be programmed into inverter resistance welder 232 using program unit 230.

One such controllable parameter is the current waveform with which the electrodes energize weldment 30 (as shown in FIG. 13A). According to a preferred embodiment, the current waveform is secondary root mean squared (RMS) DC current that is less than about 7000 amps. According to a preferred embodiment, the preselected current is constant during the welding operation and approximately 4500–6500 amps. According to a particularly preferred embodiment, for a 20-gauge, the preselected current is approximately 5000–5500 amps. According to alternative embodiments, the DC current may be fixed pulse, power RMS, primary RMS, primary limit, secondary constant current, etc. The magnetic forces produced by the DC current may be reduced by "de-gaussing" the weldment and/or welding system, and/or with use of non-metallic stands and support structures (e.g., wood base station or table, etc.).

Another parameter is the resistance of workpieces 32, 34 and electrodes 211a, 211b. Workpieces 32, 34 may be any of a variety of weldable material, including carbon steel, stainless steel, etc. According to a preferred embodiment, the workpieces are a low carbon steel such as 1008 or 1010 carbon steel and combinations thereof. Workpieces 32 and 34 may also be a variety of thicknesses. According to a preferred embodiment, the workpieces are between 16 gauge (0.059 inch) and 24 gauge (0.023 inch). Workpiece 32 is typically a flat sheet, which is overlaid or overlapped (relative to workpiece 34) during welding. According to an alternative embodiment, multiple workpieces may be stacked one upon the other. According to a particularly preferred embodiment, the workpieces are substantially free of projections that may collapse into the weld nugget. According to alternative embodiments, the workpieces may be any of a variety of conductive materials (e.g., high strength, low alloy steel, stainless steel, etc.) and have different thicknesses.

Figure 2:
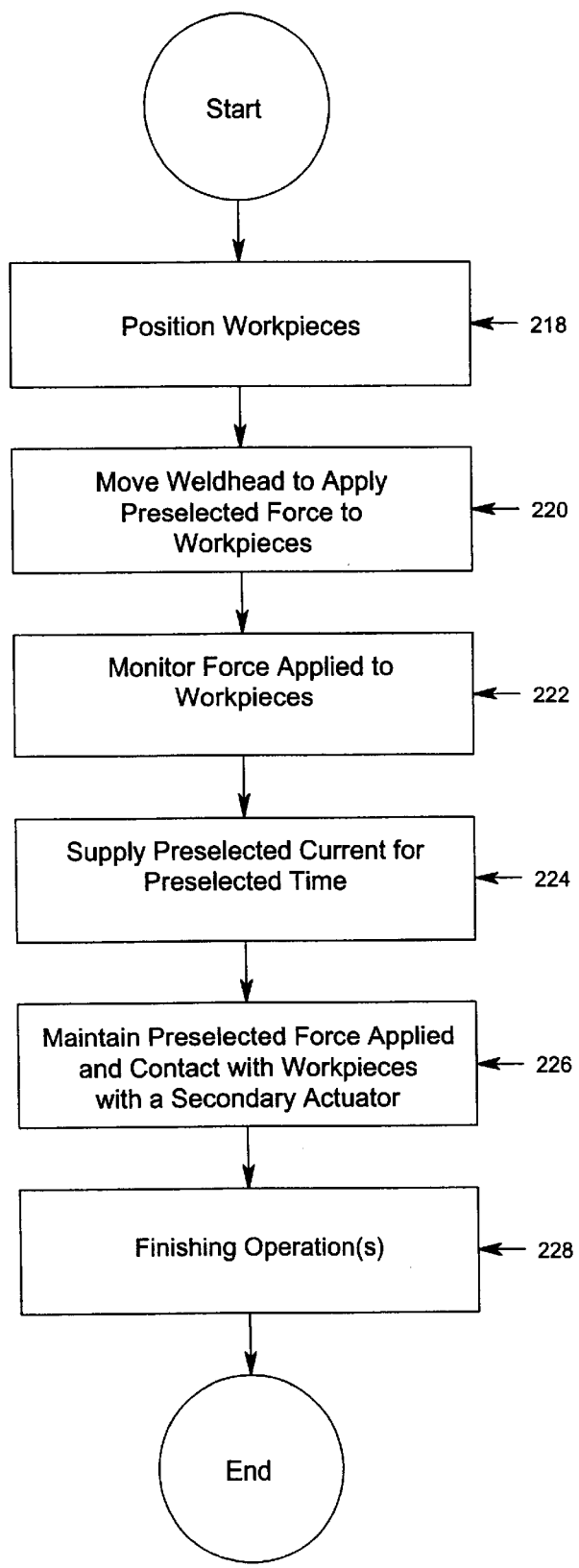
FIG. 2 is a flow chart representation of a welding operation according to an exemplary embodiment.

Another controllable parameter is the duration or time for steps of the welding process. According to a preferred embodiment, welding system 200 allows for selective control or setting of the "weld time" (i.e., the time that the weld current is supplied), the "hold time" (i.e., the time that the weldhead continues to hold the workpieces after the welding current is ceased (i.e., after weld time). A welding process according to an exemplary embodiment is shown in FIG. 2. After workpieces are positioned in weldhead 204 (step 218), input device 215 (e.g., foot pedal, palm buttons, etc.) is actuated (e.g., by the operator), which sends a signal to controller 217. Controller 217 sends a signal to primary actuator 207 for force initiation and development. Upon reaching a preselected force, sensor 214 sends a signal representative of force to inverter resistance welder 232, which sends a signal to inverter transformer 233. Inverter transformer 233 provides a preselected current for a preselected period of weld time to electrodes 211a, 211b to weld workpieces 32, 34. Secondary actuator 216 actuates to maintain contact with workpieces 32, 34. According to an exemplary embodiment, secondary actuator 216 actuates after receiving a signal from control system 202. Control system 202 may signal secondary actuator after a preselected period of time. According to an alternative embodiment, control system 202 signals secondary actuator 216 after receiving a signal from sensor 214 representative of a decrease in the amount of contact force. After the preselected weld time, control system 202 signals inverter transformer to cease current; after a preselected hold time, control system 202 signals weld head 204 to release workpieces 32, 34. After weldment 30 is formed, workpieces 32, 34 may undergo a finishing operation wherein workpieces 32, 34 are covered by a coating (e.g., paint, lacquer, filing, etc.) (step 228). By maintaining the preselected force (Fp) and supplying the preselected amount of current (Ip) for a preselected period of time (Tp), the weld does not show through or "telegraph" a surface defect on the surface of the workpiece that is visible to a customer. It is intended that no secondary operation (e.g., sanding) is necessary to remove or obscure the surface defect prior to painting.

Another controllable parameter is the preselected force that the electrodes apply over an area of the workpieces. According to a preferred embodiment, the preselected force is selected with user interface 212. Preselected force (Fp) applied over an area is less than 2000 pounds (lbs.). According to a preferred embodiment, the preselected force is less than 600 lbs. According to another preferred embodiment, the preselected force is approximately 140–155 lbs. According to a particularly preferred embodiment, the preselected force is about 148 lbs. According to alternative embodiments, the preselected force may be a variety of values or ranges selected to provide the desired weldment for the particular workpieces being welded.

Figure 3:
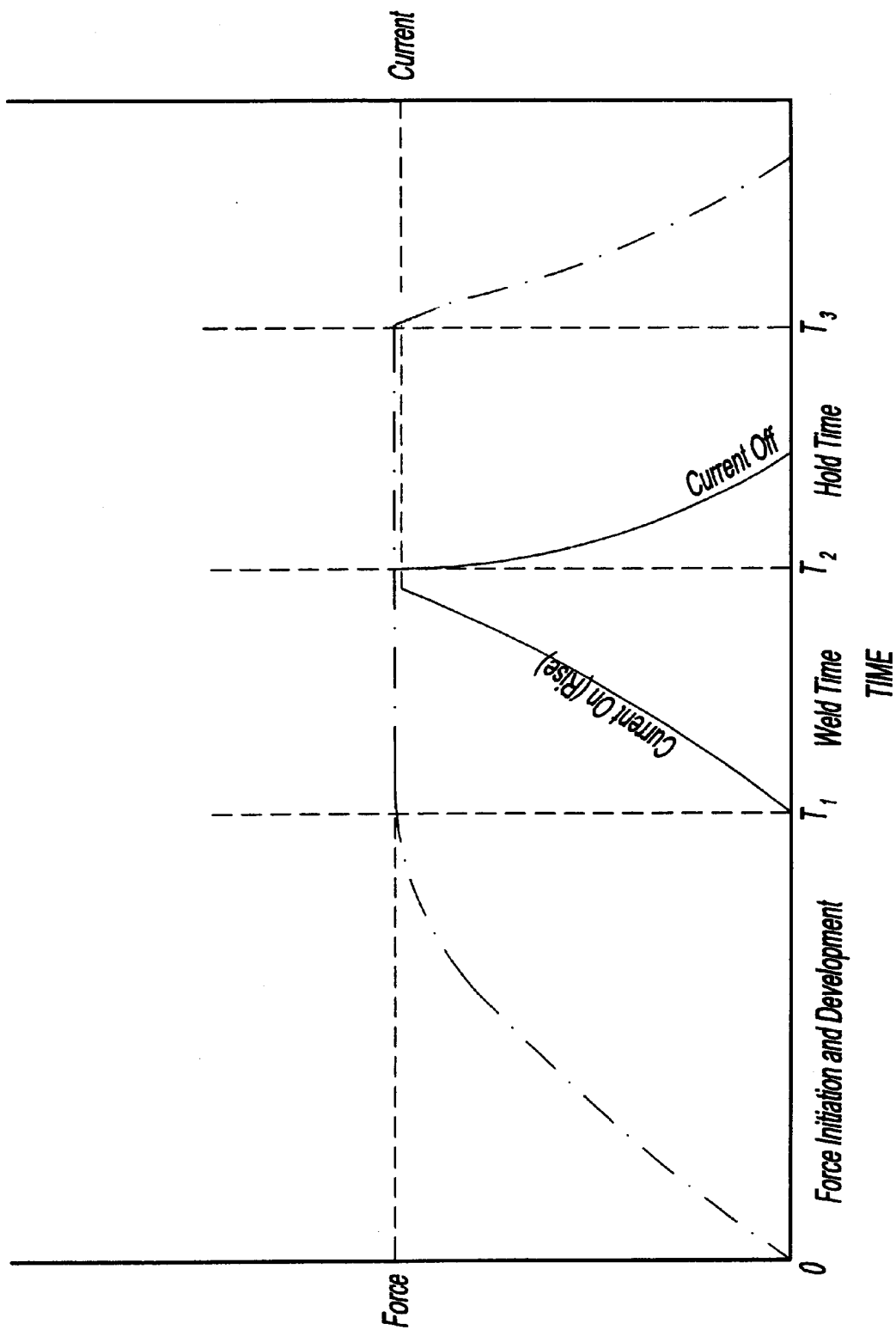
FIG. 3 is a graph of current and force versus time where the left vertical axis represents force, the right vertical axis represents current and the horizontal axis represents the time.
Figure 4:
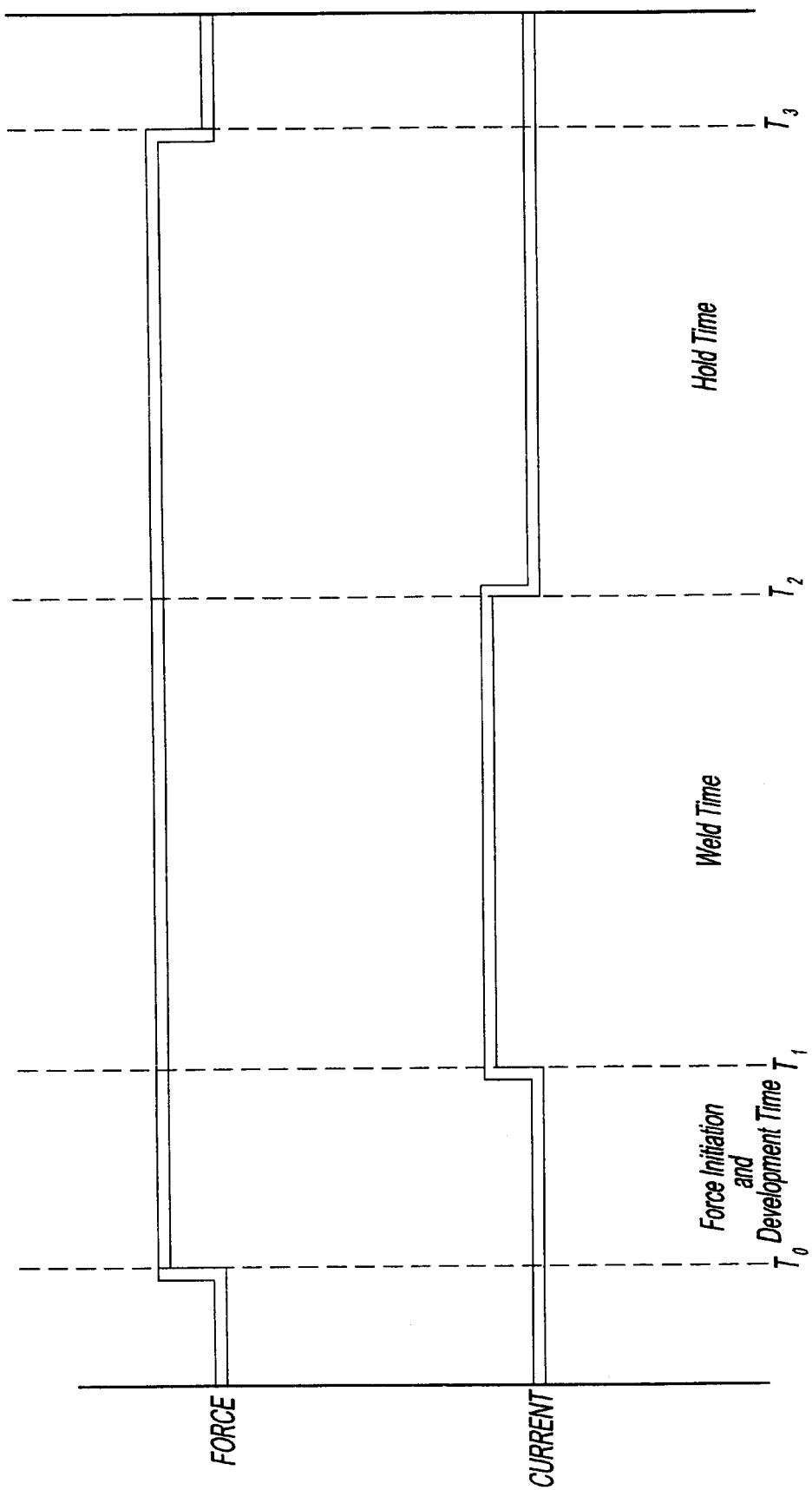
FIG. 4 is a graph that schematically illustrates the application of force, the flow of current, and the holding of the workpieces versus time.

FIGS. 3 and 4 graphically illustrate the welding operation according to an exemplary embodiment. FIG. 3 provides a graph of current and force versus time where the left vertical axis represents force, the right vertical axis represents current, and the horizontal axis represents time. After the workpieces 32, 34 are positioned in weldhead 204. Input device 215 signals controller 217, which signals primary actuator 207 to move the electrodes so that a force is applied to workpieces 32 and 34 until the preselected force (Fp) is attained. Sensor 214 then signals inverter resistance welder 232 to send a signal to inverter transformer 233 and the preselected current flows to electrodes 211a and 211b. During the time that current is flowing through workpieces 32, 34 and the joint begins to heat up, secondary actuator 216 is activated or actuated and continually "follows-up" with the correct force at the weld joint until released by control system 202 (e.g., after the current is stopped by control system 202 and a desired weld nugget is achieved). The preselected current flows until a preselected period of time ("weld time") ($T_2$) is reached. (According to a preferred embodiment, the weld time is 10–40 ms for 20-gauge material.) Electrodes 211a, 211b maintain pressure for a preselected period of time ("hold time") ($T_2$ to $T_3$) is timed out. According to an exemplary embodiment, the hold time is between 150 and 450 milliseconds. According to a preferred embodiment, the hold time is between approximately 250 and 350 milliseconds). According to alternative embodiments, the weld time and hold time may be any of a variety of time periods intended to provide the desired weldment for the particular workpieces being welded. At the expiration of the hold time ($T_3$), weldhead 204 releases workpieces 32, 34.

Actuator system 206 is configured to apply and maintains a preselected force (Fp) to primary workpiece 34 and secondary workpiece 32. Upon reaching the preselected force (Fp), inverter transformer 233 supplies a preselected current (Ip) to secondary workpiece 32 and primary workpiece 34 for a preselected amount of time (Tp) to form a weld nugget (shown as a weldment 30 illustrated further in FIG. 13A).

An exemplary control setting or schedule for welding system 200 for welding carbon steel workpieces together may be determined by any number of methods, including calculation, experimentation, empirical analysis, etc. Exemplary settings for welding two 20 gauge (0.033 inch) carbon steel workpieces using DC current may be ½ inch electrode diameter, approximately 140–155 lbs. net electrode pressure, approximately 10–40 ms weld time, 5500 amps weld current, approximately 150–450 ms hold time, about 7/16 inch or more contacting overlap, about ½ inch or more weld spacing, and approximately 0.100–0.150 inch diameter fused zone.

Figure 5:
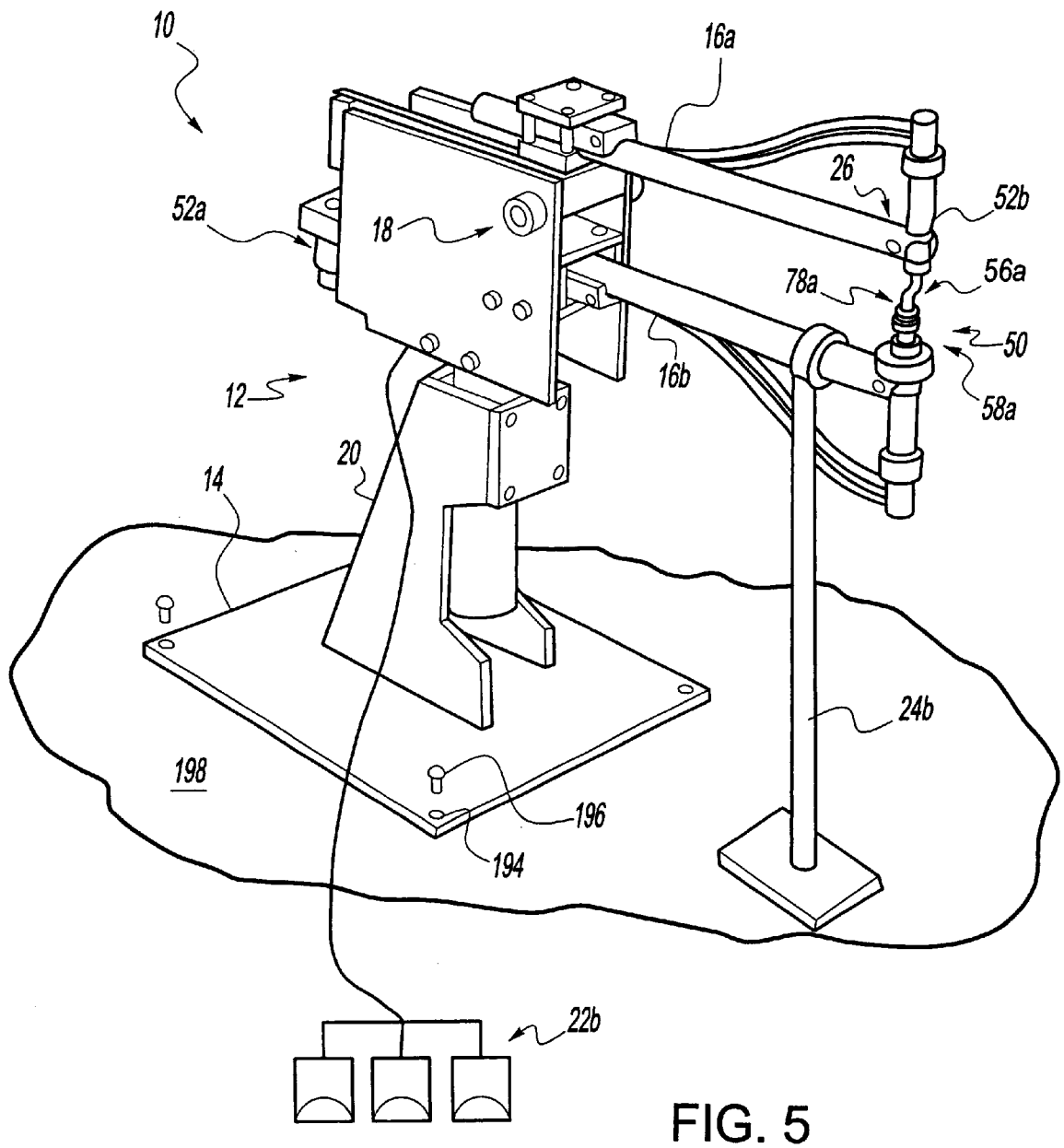
FIG. 5 a fragmentary side elevation view of a resistance welding system according to an alternative embodiment.
Figure 6:
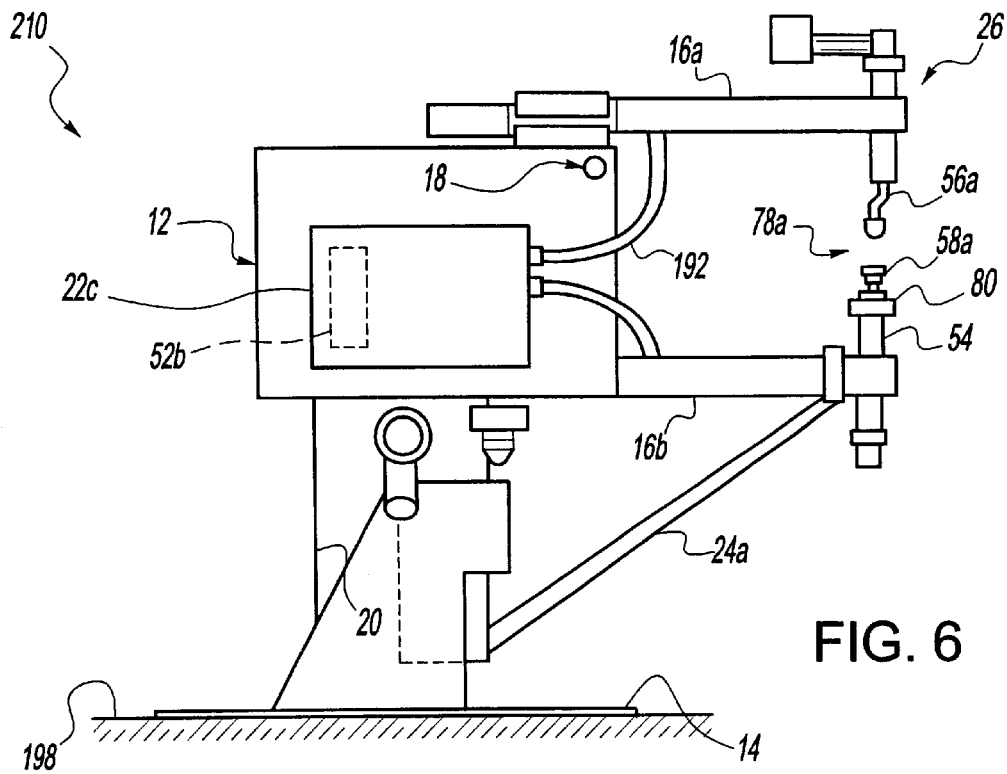
FIG. 6 is a perspective view of a welding system according to an exemplary embodiment.

According to exemplary embodiments, the welding apparatus may be any of a variety of welding designs, such as a rocker arm welder, a press welder, an automatic welder, etc. FIGS. 5 and 6 show a rocker arm welder having a welding system 10 according to an exemplary embodiment. Welding system 10 is configured to provide a "direct current flow" spot weld of weldment 30 (as shown in FIG. 13A) between primary workpiece 34 and an overlapping secondary workpiece 32. Parameters such as current waveform, force, and time are controllable in welding system 10 or 210 to produce weldment 30.

Welding system 10 includes a body or frame 12 with a support system 20 mounted to a base plate 14. According to a particularly preferred embodiment, the throat depth of the rocker arm is between 24 inches and 36 inches average. A fastener (shown as a bolt 196 inserted through an aperture 194) attaches base plate 14 to a support structure (shown as a floor 198). According to a preferred embodiment shown in FIG. 5, a support member 24b is mounted substantially perpendicular to floor 198, and is configured to reduce the deflection of arms 16A and 16B when during the welding operation. According to an alternative embodiment shown in FIG. 6, a support member 24A is mounted between arm 16B and frame 20.

Figure 8:
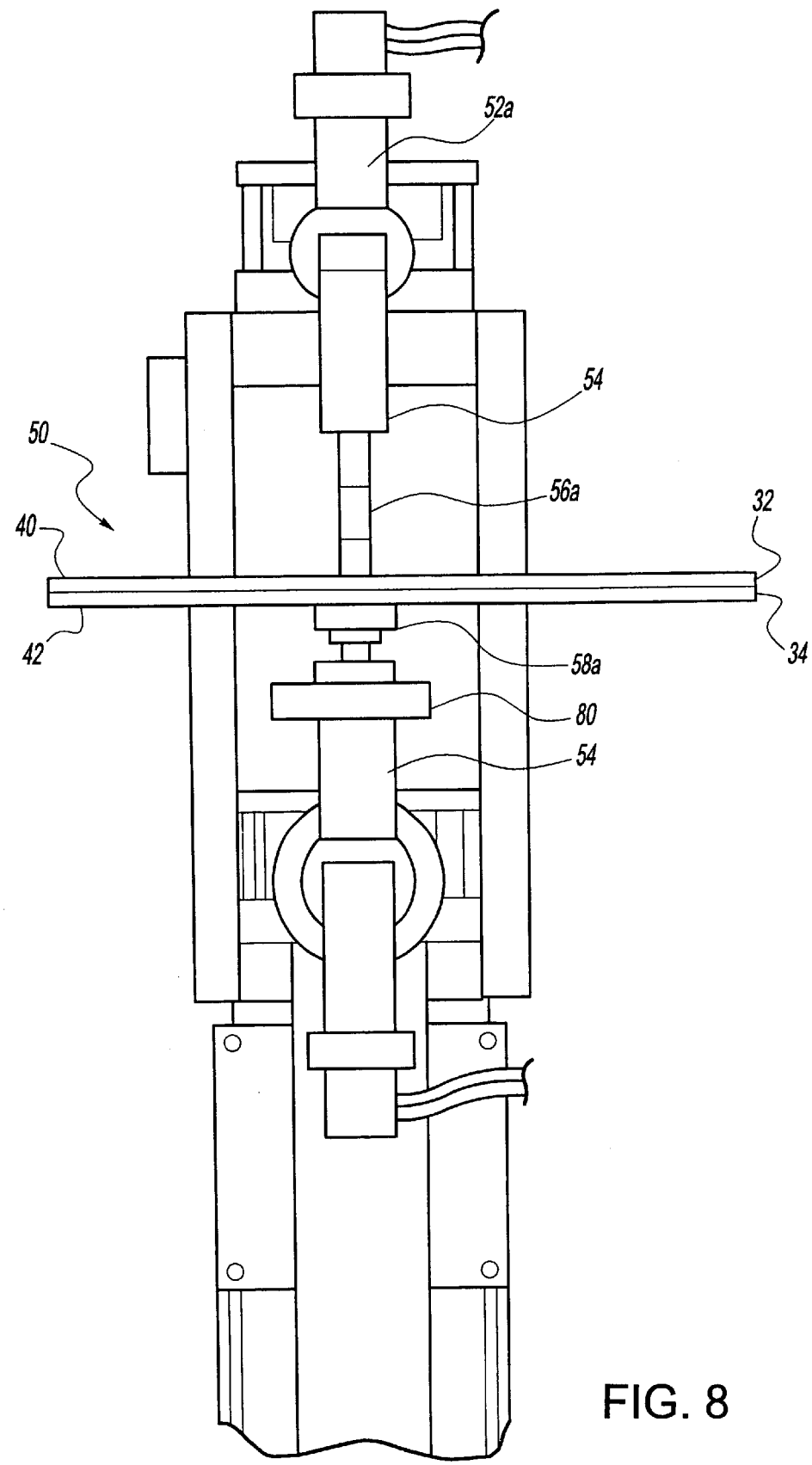
FIG. 8 is a fragmentary front view of a weldhead of the resistance welding system of FIG. 5 according to an exemplary embodiment.

The current path travels through weldhead 50 and through workpieces 32 and 34 between a set of opposed electrodes (shown as a bottom electrode 56a and a bottom electrode 58a). According to a preferred embodiment, the current flows from the lower electrode to the upper electrode. (FIG. 8 shows a detailed view of weldhead 50.) During the welding operation, electrode 56a is brought in contact with a secondary surface 40 of secondary workpiece 32, and workpiece 34 is positioned above electrode 58a (i.e., in contact with a primary surface 42 of primary workpiece 34). In general, a spot weld (shown in FIG. 13A) is formed at a relatively flat and parallel interface surface 44 between workpiece 32 and workpiece 34.

As shown in FIG. 5, pivot arm 16a extends and retracts about a fulcrum or pivot mechanism 18 in response to an input signal (e.g., from a mechanical foot pedal, electric foot pedals, or other user interface (e.g. touch screen, palm button, trigger, touch-pad, keyboard, keypad, sensor, etc.). A primary actuator (shown as a pneumatic cylinder 52a) applies a preselected force to the workpieces in response to an input signal According to alternative embodiments, the primary actuator may be any type of device for moving weldhead 50 to apply pressure to weldment 30 (e.g., hydraulic cylinder, electric, press, etc.). Cylinder 52a is configured to move arm 16a so that electrode 56a exerts a force on secondary workpiece 32. As the force is applied, weldment 30 is drawn together (e.g., "pinched" or "squeezed").

A secondary actuator (e.g., a "fast follow-up" cylinder or a "fast follow-up" electrode 52b) is operably coupled to electrode 52a to assist in maintaining the contact and preselected force on secondary surface 40 of secondary workpiece 32 during the welding process. According to alternative embodiments, the secondary actuator is any of a variety of devices configured to provide fine increments of movement and/or force.

Figure 7:
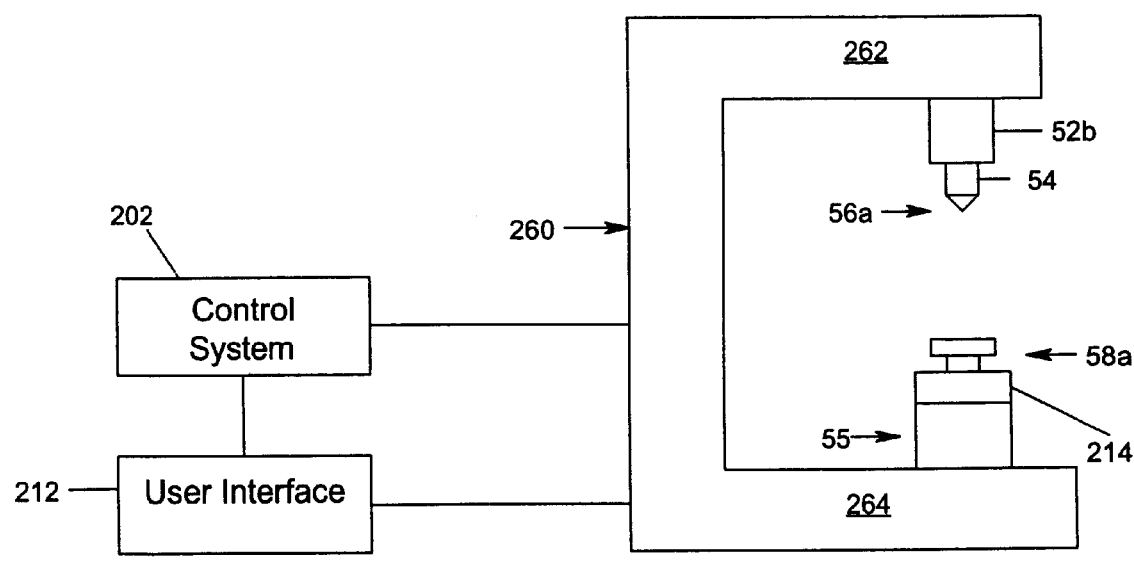
FIG. 7 is a perspective view of a welding system according to an exemplary embodiment.

FIG. 7 shows a C-frame welder 260 having an upper arm 262 and a lower arm 264. Fast follow-up cylinder 52b is coupled to a terminal end of upper arm 262 and positioned "in-line" with electrode 58a. Actuation of fast follow-up cylinder 52b moves electrode 56a along a vertical, linear axis. In-line positioning of fast follow-up cylinder 52b is intended to take optimum advantage of current flow and force when producing weldment 30 by improving alignment of the electrodes interface surface 44, and reducing "expulsion" at electrodes 56a and 58a against the workpieces.

A pressure transducer (shown as a sensor 214 in FIG. 1) is shown located between fast follow-up cylinder 52b and electrode holder 54, to provide a signal representative of the force being applied to workpieces 32, 34. According to a preferred embodiment, the sensor is located in a lower electrode holder 55. According to alternative embodiments, various devices may assist in the control of the amount of pressure applied by electrode 56a.

According to a particularly preferred embodiment, the transducer is a WT9000 model transducer commercially available from Sensotec Corporation of Columbus, Ohio. The transducer may produce a high-speed analog signal throughout the welding operation (e.g., squeeze, weld, hold, etc.) while withstanding weld currents up to about 50K amps. According to an alternative embodiment, the transducer may also include an internal current sensor (not shown) that provides a relatively accurate secondary current signal that is insensitive to position, orientation and current frequency. According to other alternative embodiments, a signal representative of the force being applied to the workpieces may be obtained from any of a wide variety of other sensor or sensing devices.

According to a preferred embodiment, the transformer is a DC transformer rated at approximately 40–150 kVA. According to another preferred embodiment, the transformer is rated at 60–80 kVA. According to a particularly preferred embodiment, the transformer is Model No. TDC-1099 commercially available from Roman Manufacturing, Inc., of Grand Rapids, Mich. According to alternative embodiments, other suitable transformers of a variety of types may be included in the power electronics.

A cooling system (not shown) may be provided for regulating the water flow and temperature of welding system 10. The cooling system is intended to dissipate heat from the electrodes, the power electronics, control system (e.g., transformer, inverter, etc.), and other elements of the welding system. The dissipation of heat from the electrodes is intended to extend their useful life. Treated water is a preferred coolant for the cooling system, but the coolant may be any other suitable material (e.g., distilled water, freon, glycol, air, etc.). The coolant preferably flows continuously through the cooling system and may be recycled, refurbished, or regenerated. According to a particularly preferred embodiment, the cooling system is a Model No. JT-250 commercially available from Koolant Koolers, Inc. of Kalamazoo, Mich. According to alternative embodiments, the cooling system may be any of a variety of commercially available systems or comprise a variety of configurations.

Figure 9:
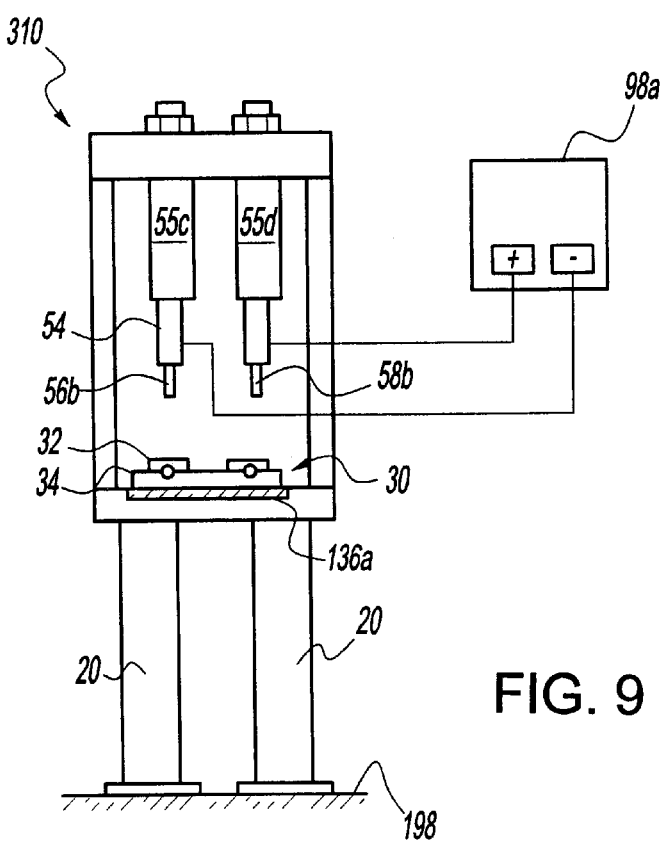
FIG. 9 is a front elevation view of a resistance welding system according to an alternative embodiment.
Figure 15A:
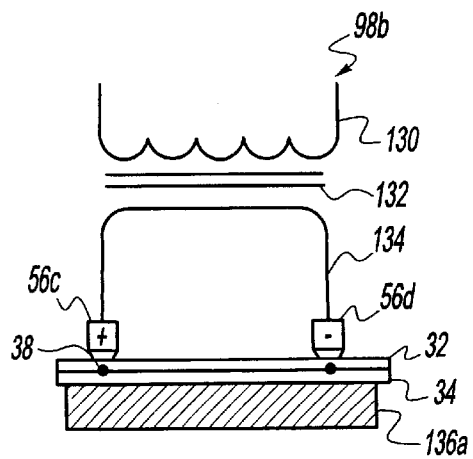
FIGS. 15A and 15B are fragmentary sectional views of resistance series welding systems according to alternative embodiments.
Figure 15B:
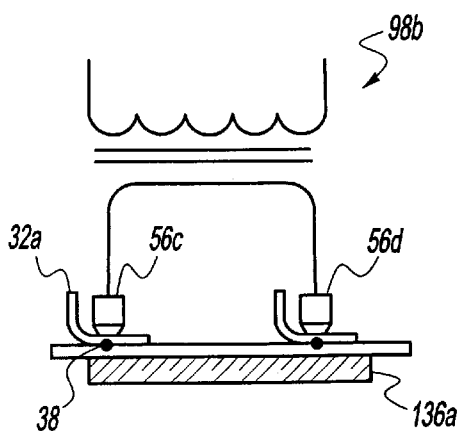
Figure 15C:
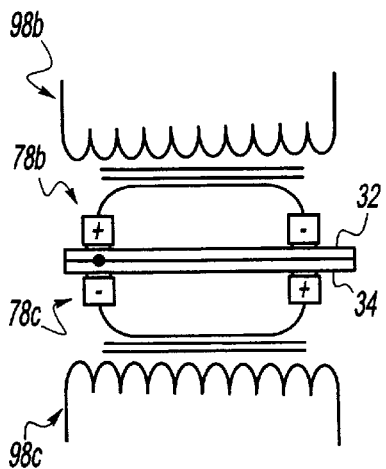
FIGS. 15C through 15H are fragmentary sectional views of resistance indirect welding systems according to alternative embodiments.

FIG. 9 schematically illustrates a welding system 310, an alternative embodiment of welding system 10. Welding system 310 is configured for "series" type welding and includes cylinders 55c and 55d. Cylinder 55c is positioned on the same side of workpiece 32 as cylinder 55d. In operation, cylinders 55c, 55d extend the electrodes toward and away from weldment 30 (e.g., to press the workpiece against a current conducting mandrel 136a or a nonconductive plate). During the welding operation, cylinders 55c, 55d are configured to maintain contact with and the preselected force on the workpieces. (FIGS. 15A and 15B schematically illustrates series welding arrangements.)

Figure 15D:
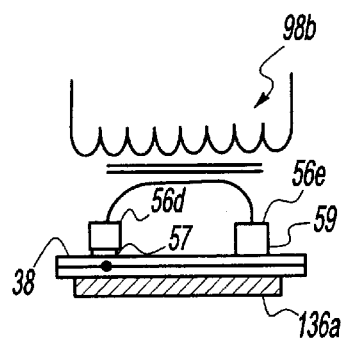
Figure 15E:
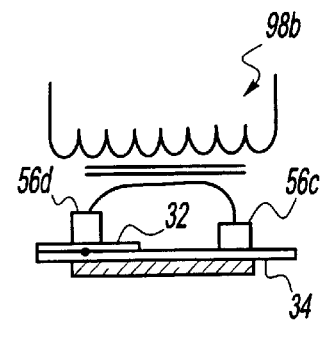
Figure 15F:
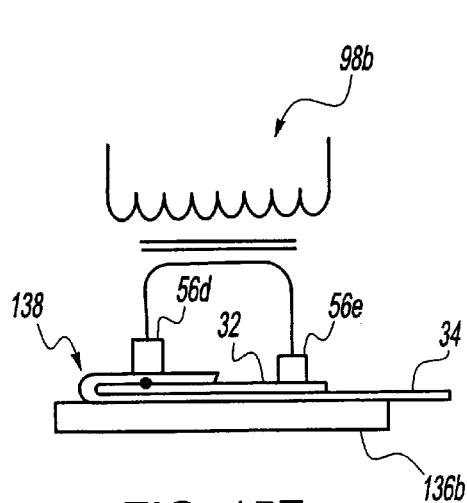
Figure 15G:
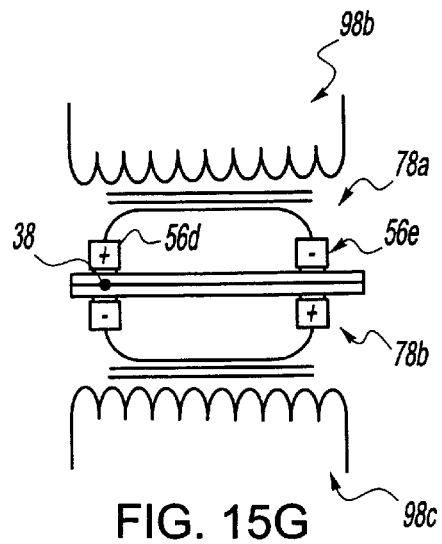
Figure 15H:
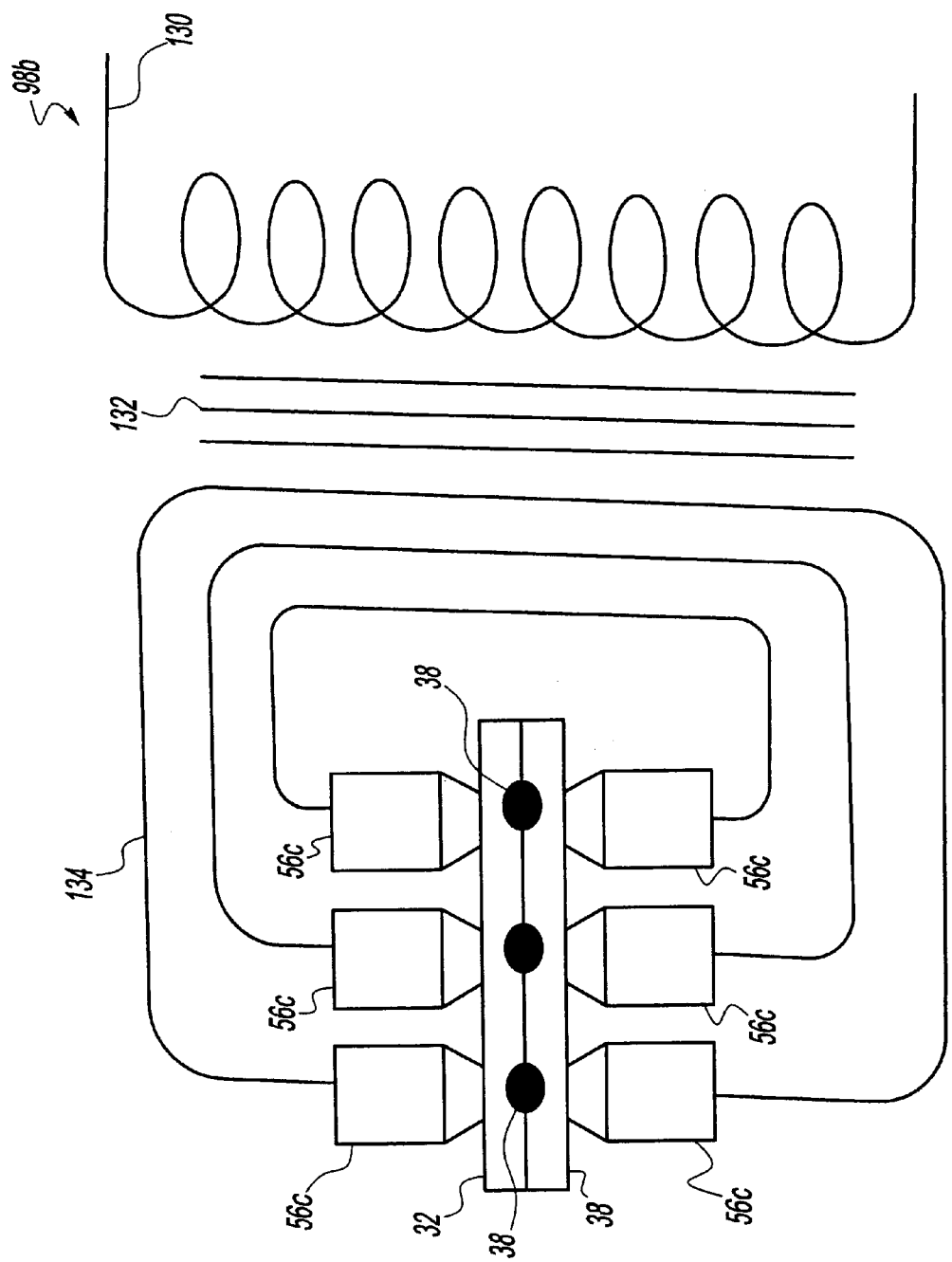

According to other embodiments, any of a variety of welding apparatus structures (e.g., rocker arm welder, C-frame welder, series welder, resistance spot welder, press welder, automatic welder, robotic welder, etc.) may be used as known to one of skill who reviews this disclosure. (FIGS. 15D, 15E, and 15F schematically illustrate indirect current welding arrangements.)

FIGS. 10–12 illustrate exemplary embodiments of the upper and lower electrodes. Referring to FIGS. 10 and 11, upper electrode 56a preferably includes a hollow, bent shank 60a attached about the periphery of a taper 65 of a cap or tip 62a. (According to an alternative embodiment, the shank is straight.) According to a preferred embodiment, upper electrode 56a is coupled to a secondary actuator configured to maintain adequate contact and weld pressure on workpieces 32, 34. A cooling input (shown as a coolant tube 70) is in fluid communication with the cooling system through tube 70 to cool tip 62a. Tube 70 is located within a hot-return channel 68a of shank 60a and tip 62a. Spent coolant is returned through a hot return channel 68a. According to a preferred embodiment, the end of tube 70 has approximately a 45° angle and is disposed in a space or hole 76 so that the end of tube 70 touches tip 62a. (A similar cooling arrangement for lower electrode 58a may also be provided.) According to alternative embodiments shown in FIG. 11, surface 64a is substantially flat or planer. According to an exemplary embodiment shown in FIGS. 10–12, the exterior of tip 62a is surrounded by an insulating ring or sleeve 66. Sleeve 66 is applied (e.g., slipped on, attached, etc.) to tip 62a and made from a relatively non-conductive material (e.g., plastic, nylon, etc.) to assist in preventing electrode 56a from "shorting out" against secondary workpiece 32 (e.g., when secondary workpiece 32 includes a surface (e.g., a "hat section" (not shown) or the like) that is disposed adjacent the tip). According to another exemplary embodiment shown in FIG. 10, the lower electrode and/or shank is insulated with a plastic sleeve material.

According to a particularly preferred embodiment, the tip of the upper electrode has a ½ inch diameter, is a type "F" with a 2 inch radius, is RWMA class 3 or 4 copper commercially available from Taylor Winfield Corporation of Brookfield, Ohio. According to alternative embodiments, the upper electrode may be any of a variety of electrodes and have any of a variety of configuration and arrangements. FIG. 12 shows an upper electrode 56b according to an alternative embodiment. Electrode 56b includes a tip 62c having a curved or radiused surface, and is surrounded by sleeve 66.

According to a preferred embodiment (as shown in FIG. 11), the lower electrode is a "swivel" electrode 58b. Lower electrode 58b includes a taper 60b having a protrusion (shown as a ball 72) which is inserted within a cavity (shown as a socket 74) of a head 62b. Head 62b is configured to pivot or swivel relative to taper 60b in a ball-and-socket type arrangement. According to a preferred embodiment, head 62b provides a relatively flat planar surface 64b for abutment against primary workpiece 34, and may pivot to maintain in-line positioning between surface 64a and surface 64b regardless of the position of weldment 30. Taper 60b is held in place (e.g., pressed into an interference fit, tapered fit, fastened, etc.) by a mounting structure (shown as an electrode holder 54 in FIG. 8). According to a particularly preferred embodiment, the lower electrode is a OSB-353 electrode commercially available from Tuffaloy Corporation of Troy, Mich. and provides an approximately one inch diameter weld surface. According to alternative embodiments, the lower electrode may be any of a variety of electrodes and have any of a variety of configurations and arrangements.

During the welding operation, the stationary electrode preferably delivers a negative charge to primary workpiece 34. According to a particularly preferred embodiment, the lower electrode is negative and the top electrode is positive. Tip 62a and shank 60a of electrode 56a and tip 62b with taper 60b of electrode 58a are preferably made from a material having a relatively high electrical conductivity, and designated by the Resistance Welders Manufacturers Association (RWMA) as Class 2, 3, or 4 copper. The electrodes may be of the same or different classes. According to a preferred embodiment, the upper electrode is RWMA Class 3 or 4 copper, and the lower electrode is RWMA Class 2 copper.

FIG. 13A shows weldment 30, which includes a weld nugget 38 coupling primary workpiece 34 and secondary workpiece 32. Primary surface 42 of primary workpiece 34 may be visible or revealed to a customer or user, and secondary surface 40 of secondary workpiece 32 may be concealed from the customer (e.g., turned toward the interior of an article of furniture, obscured or obfuscated by bending, etc.). A demarcation between the molecular structure of the workpiece material and the molecular structure of the weld nugget (i.e., grain boundary which is shown as a "heat affected zone" 39) is shown surrounding weld nugget 38. During the welding operation, nugget 38 is formed at an interface surface 44 as secondary surface 40 and primary surface 42 each collapse to form a surface defect, (e.g., depression, contour, divot, well, etc.) and shown as 36a and 36b (in FIG. 13A). According to a preferred embodiment, the growth (e.g., size, location, shape, etc.) of weld nugget 38 may be controlled by individual, selective control of one or more welding parameters (e.g., weld current, weld time, hold time, preselected force, follow-up or secondary actuation and force, electrode shape, size, or type, etc.) so that surface defect 36b on primary surface 42 is not substantially perceptible or visible to the naked eye. According to an exemplary embodiment, surface defect 36b on primary surface 42 is not substantially perceptible or visible to the naked eye after being covered with a coating (e.g., paint, lacquer, film, etc.). Surface defect 36b is shown having a lesser depth than surface defect 36a on secondary surface 40 in FIG. 13A. Thus, primary surface 42 is suitable as an exterior surface of an article of furniture for viewing by a customer or,user. Secondary surface 40 may be somewhat less suitable as an exterior surface for viewing due to the greater depth of surface defect 36a.

According to a preferred embodiment, the upper electrode have a different RWMA class copper than the lower electrode. According to a particularly preferred embodiment, the upper electrode is a RWMA class 3 or 4 copper, and the lower electrode is a RWMA class 2 copper. Providing different RWMA classes of copper electrodes is intended to control the location and growth of the heat affected zone of nugget 38.

Figure 14:
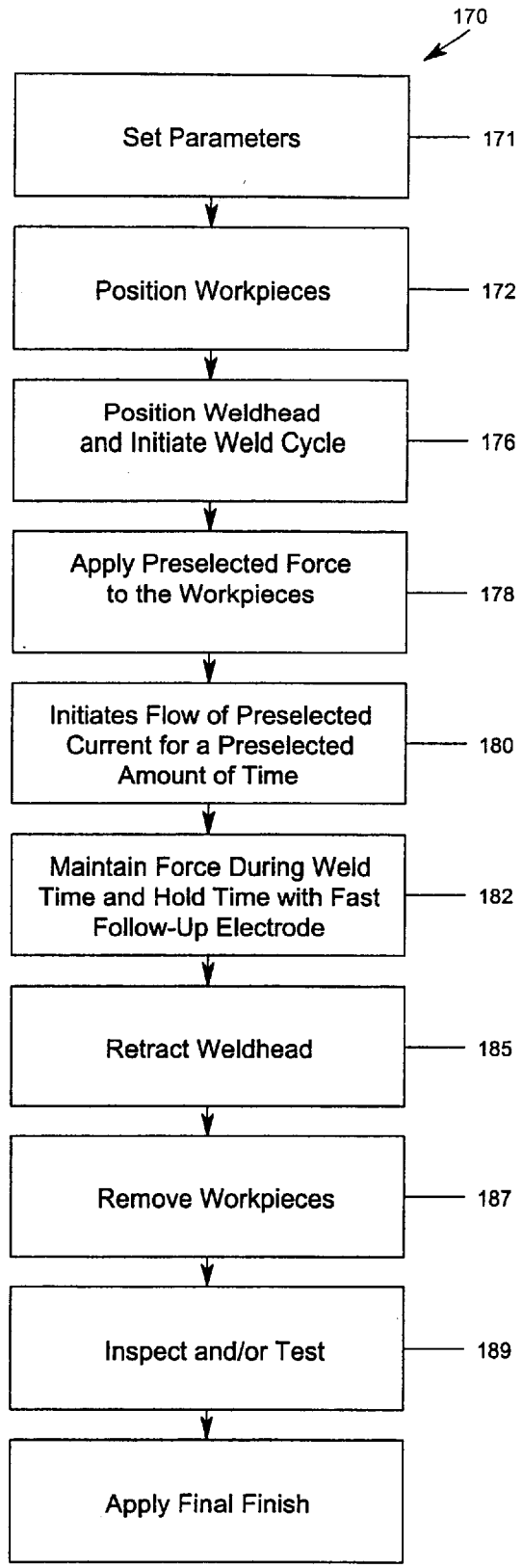
FIG. 14 is a block diagram of a method of operating the resistance welding system of FIG. 5 according to an exemplary embodiment.

FIG. 14 shows a method 170 of operating welding system 10 according to an exemplary embodiment. Method 170 is intended to provide a spot weld that does not show through or "telegraph" its mark on the primary surface (i.e., the painted or customer side) of office furniture without any secondary (finishing) operation to remove, cover, obscure, etc the mark prior to painting. According to method 170, one or more parameters may be set (e.g., by an operator) (step 171) such as the preselected force, weld time, hold time, current, etc. (e.g., with the program unit, user interface, etc.). Workpieces 32 and 34 of weldment 30 are positioned between electrodes 56a and 58a. Primary actuator 52a is activated by the operator through the user interface (e.g., by pressing mechanical or electric foot pedals or palm buttons), which sends a signal to the controller and initiates the primary actuator 52a. Upon initiation, electrodes 56a and 58a of weldhead 50 are moved into position to make contact with workpieces 32 and 34, respectively (step 176) and apply a preselected force (step 178). A signal representative of the pressure applied between the electrodes on the workpieces is provided by pressure transducer 80. A current is applied (e.g., by the inverter resistance welder and inverter transformer) through electrodes 56a and 58a when a preselected pressure signal reaches a preselected threshold value. The current flows for a preselected amount of the time at a preselected amount of amperage (step 180). Weldhead 50 remains in contact (i.e., in a "down" position) with weldment 30 for a preselected amount of hold time (step 182). Weld nugget 38 is formed at faying surface 44 between workpieces 32 and 34, and the top electrode is then disengaged. (Continuous cooling of welding system 10 is conducted throughout the welding process.) The control system signals weldhead 50 to retract or release the workpieces and return to a retracted or "home" position (step 185), and the workpieces may be removed (step 187). After being removed from weldhead 50, the workpieces may be inspected and/or tested (step 189). The inspection and/or testing may be destructive or non-destructive and may be performed randomly or after a predetermined number of welds are formed. Non-destructive tests include unaided visual examination under fluorescent light, measurement with a gauge or meter 150 (shown in FIG. 16). Destructive tests may include a peel test, etc. Certain parameters (e.g., contact force, current, weld time, etc.) may be varied after performing any of the inspections and/or tests after obtaining a parameter (e.g., depth of the dimple on the use surface) that is outside a pre-determined range. Surface defect 36b on primary surface 42 may undergo finishing operations (e.g., application of a coating such as paint, lacquer, etc.) so that surface defect 36b is not substantially visible to the naked eye (e.g., qualitatively). According to a particularly preferred embodiment, the welded components may be painted with 1.5 mils of mica paint, 1.0 mils of opaque paint, or about 1.4 to 1.8 mils of powder paint.

A wide variety of types of resistance spot welds (e.g., direct welds, series welds, indirect welds, etc.) may be used with the welding system. FIGS. 15A and FIG. 15B show series welding configurations and arrangements according to an alternative embodiment. FIG. 15A shows a transformer 98b providing a primary coil 130 adjacent a core or rod 132 for inducing a current (e.g., magnetically) in a secondary coil 134. Positive electrode 56c and negative electrode 56d are in physical and electrical contact with secondary workpiece 32, supported by primary workpiece 34 and a current conducting metal bar or mandrel 136a. Upon energizing electrodes 56c and 56d, weld nugget 38 is formed at the faying surface. FIG. 15B shows a series welding configuration according to an alternative embodiment in which secondary workpiece 32a is not necessarily continuous between electrodes 56c and 56d.

FIGS. 15D through 15F show indirect welding configurations according to alternative embodiments. FIG. 15D shows a circuit generally identical to the circuit shown in FIG. 15A, except that one electrode 56d has a contoured tip 57 and another electrode 56c has a blunt tip 59 so that only one weld nugget 38 is produced by the electrodes. FIG. 15E shows an indirect welding configuration similar to that of FIG. 15D where electrode 56d is in physical contact with workpiece 32 and electrode 56e is in physical contact with workpiece 34. FIG. 15F shows an indirect welding configuration useful for the welding of a clinch flange 138, in which weldment 30 is supported by a non-conductive mandrel 136b.

Selective control of individual parameters such as current, force, and time assist in forming the surface defect (e.g., depression 36b) that is relatively shallow relative to traditional welding systems. Parameters are set so that a convex defect is not formed by the welding operation (i.e., the welding operation forms a concave defect or no contour defect). According to a particularly preferred embodiment, the depth of concave defects is in within a range of approximately 0.0000 inch to −0.0008 inch. According to a particularly preferred embodiment, the depth of concave defects is in within a range of approximately 0.0000 inch to −0.0005 inch. A surface defect that is relatively deep may require additional processing steps such as sanding or grinding, or coating with excessive paint. One or more layers of paint may be used to cover or fill dimple 36b so that secondary surface 42 is generally planar. According to a particularly preferred embodiment, the paint is model number 4781 green liquid mica high solids baking enamel paint commercially available from Environmental Coatings Inc. of Indianapolis, Ind. applied at a thickness of at least about 1.5 mil; model number #835 liquid solid/opaque black high solids baking enamel paint commercially available from Environmental Coatings Inc. of Indianapolis, Ind. applied at a thickness of at least about 1 mil; and a polyester-epoxy hybrid powder coating model number 835 commercially available from PPG Industries of Pittsburgh, Pa. applied at a thickness of at least about 1.4 to 1.8 mil.

Figure 16:
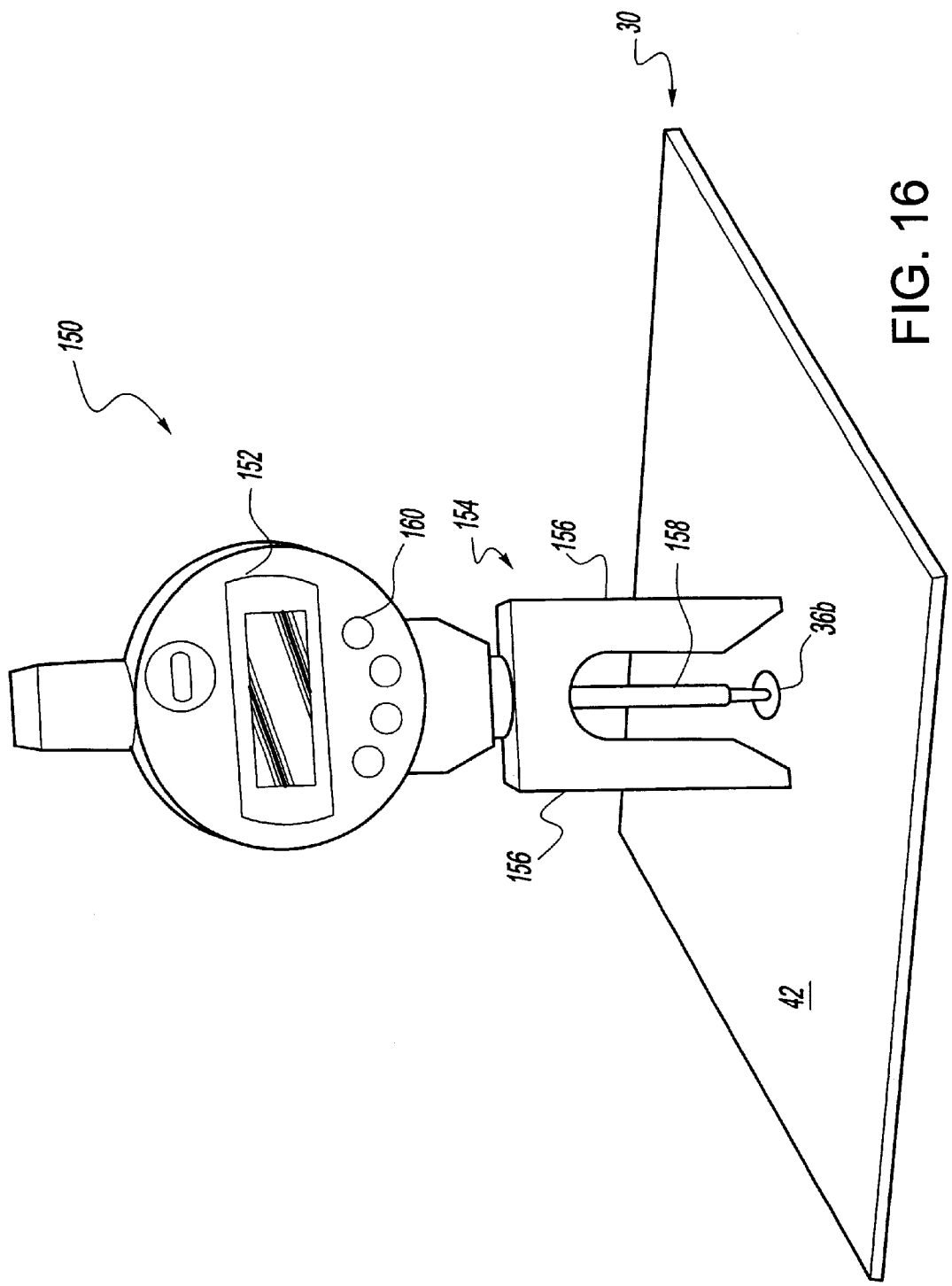
FIG. 16 is a perspective view of an apparatus for measuring a depression in a workpiece.

FIG. 16 shows a measurement instrument (shown as a meter 150) for quantitatively measuring the depth of dimple 36b in primary surface 42 of weldment 30. Meter 150 includes a display or screen 152 for electronically (or manually) displaying information corresponding to a signal representative of the depth of dimple 36b. Screen 152 is supported by a C-shaped stand 154 from which two elongate legs 156 project. A sensor (shown as a retractable pin 158) extends from stand 154 for measuring the distance between primary surface 42 (or the bottom of leg 156) and the bottom of dimple 36b. Meter 150 may include a user interface (e.g., a zero or zero-out button 160) for input or calculation (e.g., tare weight, storing, clearing, etc.) of information. According to an alternative embodiment, the measurement instrument may be any of a variety of instruments (electric, optical, etc.) configured to detect and/or measure a surface defect.

The finished weldment (i.e., end product) may be inspected using at least one of a destructive or a non-destructive test (shown as step 189 in FIG. 14). The test may be performed randomly or after a predetermined number of welds are formed. Certain parameters (e.g., force, current, weld time, etc.) may be varied after performing any of the tests after obtaining a parameter (e.g., depth of the dimple on the use surface) that is outside a pre-determined range.

According to one non-destructive test, end product (i.e., weldment 30) defects may be detected by unaided visual examination under fluorescent light, where the end product is at least two feet away from the viewer's eye. Acceptability may be determined by visual comparison to a pre-selected reference standard. The non-destructive test method is intended for use with an end product including no more than about three cured coats of paint and substantially no air dry touch up on use surface 42. According to another non-destructive test, the depth of dimple 36b may be measured using a gauge or meter (e.g., meter 150 as shown in FIG. 16) or with a similar measuring instrument. According to a preferred embodiment, the surface under evaluation is viewed in the same relative position as it would be in it's normal usage. After proper positioning, the surface is evaluated at a distance of about twenty-four inches or more from the observer, using soft indirect lighting as would be found in an office situation.

The end product may also be inspected by conducting any of a variety of destructive tests to verify the formation of weld nugget 38. One destructive test that may be a "peel" test performed in accordance with ISO 10447:1991(E). Referring to FIGS. 17A through 17C, the peel test includes peeling or urging apart (i.e., to destruction) test weldment 30 including two overlapping metal workpieces 32 and 34 joined by a single weld nugget 38. Weldment 30 is positioned generally vertically in a grip stand (shown as a vice 199) (see FIG. 17A). Weldment 30 is bent so that workpieces 32 and 34 are positioned generally vertical relative to vice 199 (see FIG. 17B). One of workpiece 32 and workpiece 34 is then urged, bent, torn or "peeled" from workpiece 32 or 34 to expose weld nugget 38 (see FIG. 17C). Weld nugget 38 may then be measured by a measuring instrument (e.g., ruler, scale, calipers, compared to reference, etc.).

According to a preferred embodiment, for exterior surface spot welds (i.e., where one electrode contacts primary surface 42 of the end product that will remain exposed after final assembly): the resultant nugget 38 (i.e., measurable transfer of fused material from one workpiece to the other workpiece) may have a diameter no less than about two times the thickness of the thinnest workpiece. Where differing gauges of workpieces are used, the measurement is based on the thinnest material. According to an alternative embodiment, a "coupon" peel test may be performed according to ISO 10447 using sample test pieces instead of workpieces 32, 34.

According to a particular preferred embodiment, acceptable nugget size and shear and tensile forces for relatively low carbon workpieces are shown in TABLE 2.

TABLE 2

| Gauge | Thickness of Workpiece (inch) | Minimum Nugget Diameter (inch) | Minimum Shear Strength (lbs.) | Minimum Tensile Strength (lbs.) |
| --- | --- | --- | --- | --- |
| 24 | 0.021 | 0.042 | 95 | 99 |
| 22 | 0.028 | 0.056 | 212 | 188 |
| 20 | 0.033 | 0.066 | 317 | 267 |
| 18 | 0.043 | 0.086 | 577 | 465 |
| 16 | 0.055 | 0.11 | 979 | 770 |
| 14 | 0.07 | 0.14 | 1621 | 1258 |
| 13 | 0.081 | 0.162 | 2190 | 1689 |
| 11 | 0.112 | 0.224 | 4238 | 3244 |

The electrodes may be replaced after a predetermined number of welds is reached (e.g., 3200 welds). An indicator (e.g., overhead light, sound, etc.) may signal when the predetermined number of welds is reached. Welding system 10 may automatically indicate (e.g., shutdown, lockout, etc.) after reaching the predetermined number of welds such that operation of welding system 10 may only be continued after replacement of electrodes 56a or 58a, and/or after re-setting of a locking device (e.g., with a key).

Figure 18:
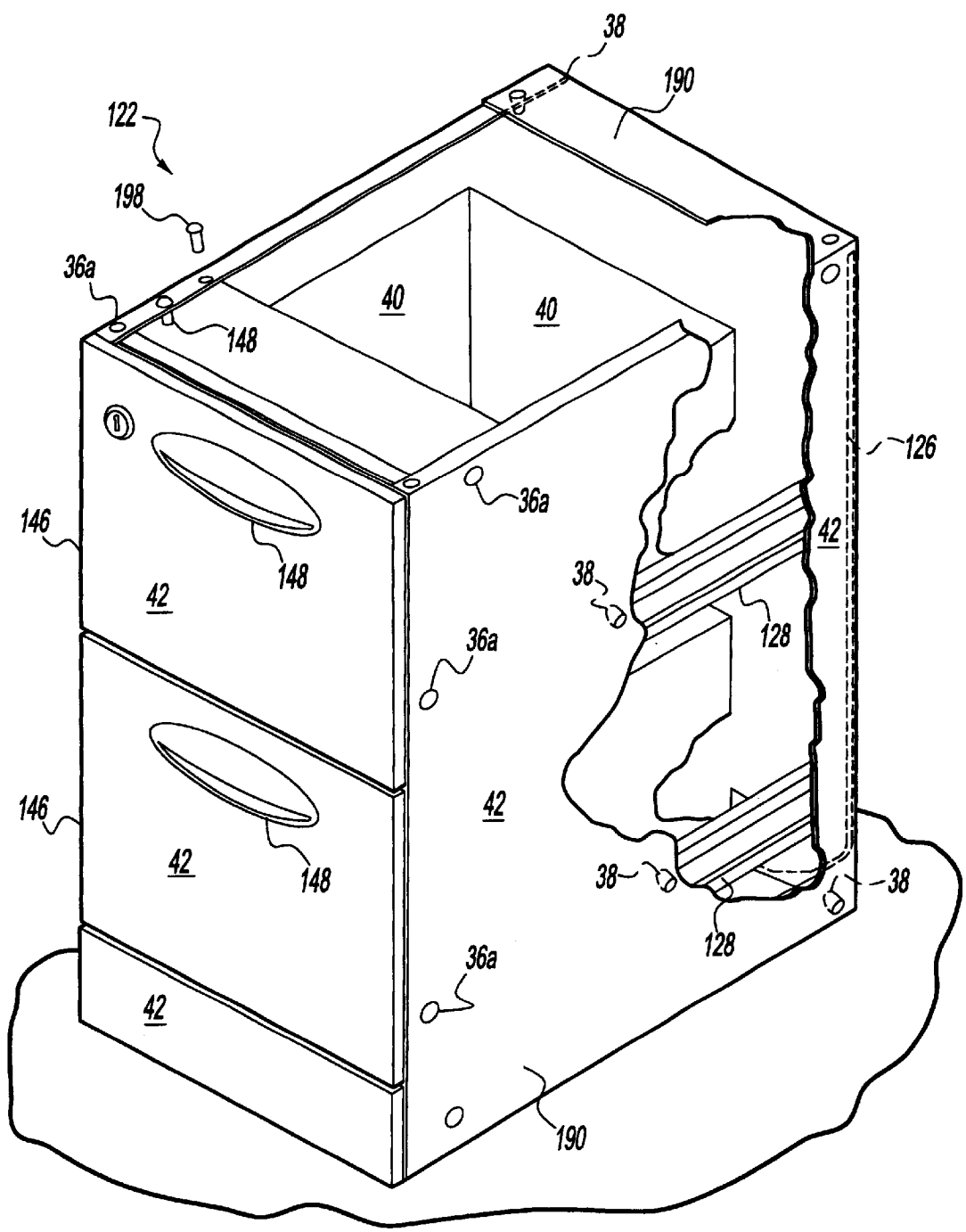
FIG. 18 is a schematic fragmentary perspective sectional view of an article of furniture according to an exemplary embodiment.

FIG. 18 shows an end product article of furniture (shown as a filing pedestal 122). Pedestal 122 includes a front frame 124 coupled to a pair of rear vertical uprights 126 by horizontal drawer slides 128. Slides 128 are attached (e.g., with fasteners, weld, adhesive, etc.) to front frame 124 and vertical uprights 126 for housing containers (shown as drawers 146). Drawers 146 each may include a handle 148 and may be selectively extended and retracted from slides 128 (e.g., in a sliding motion). A generally metallic cover sheet 190 is attached to front frame 124 and vertical uprights 126 by weld nugget 38, which may be fabricated to provide surface defect 36a in primary surface 42. Secondary surface 40 of cover sheet 190 is generally concealed and is not substantially visible to a worker (not shown). Weld nugget 38 provides a structural attachment of cover sheet 190 to front frame 124 and vertical uprights 126.

Figure 19:
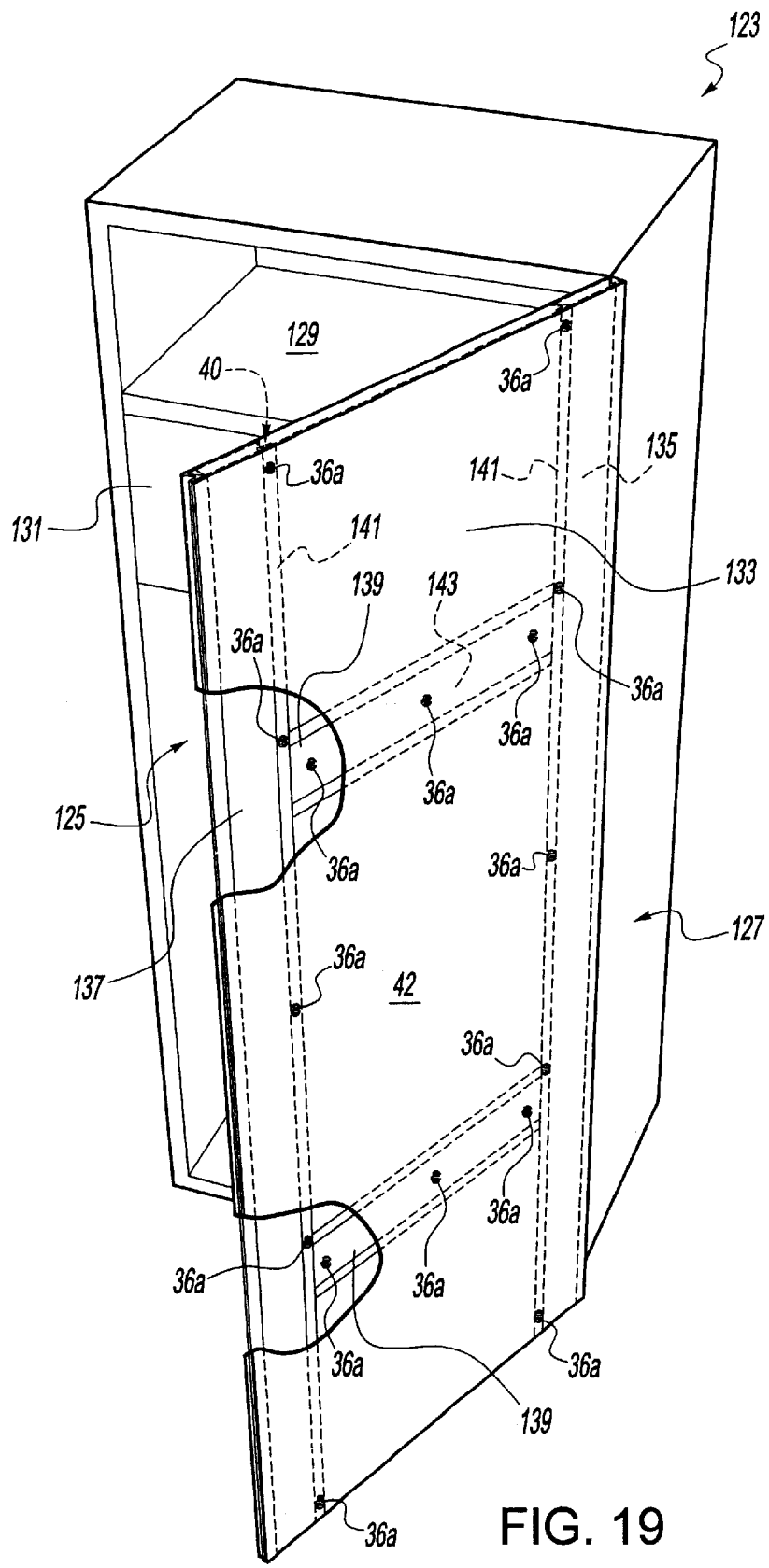
FIG. 19 is a schematic fragmentary perspective sectional view of an article of furniture according to an exemplary embodiment.

FIG. 19 shows an end product article of furniture (shown as a tower 123). Tower 123 includes a door 125 coupled to a housing 127 by one or more hinges (not shown). Tower 123 may also include one or more shelves 129 and/or one or more drawers 131. Door 125 includes a plurality of braces (shown as hat sections), which include an inner vertical brace 135, an outer vertical brace 137 and a pair of horizontal braces 139. Inner vertical brace 135 and outer vertical brace 137 both include a flange 141 which is welded to a back surface of door 125. Horizontal braces 139 include a middle portion 143 which is welded to the back surface of door 125. Outer surface 133 of door 125 comprises a primary surface 42 such that welding of flange 141 and middle portion 143 produces surface defect 36a (schematically identified by a shaded region).

The control system is not intended to be limited to any particular type of controller or control device capable of implementing the intended functionality (i.e., continuously measuring the values of welding parameters and automatically acting to correct deviation from pre-set values through a feedback loop system). The user interface may include controls for setting and calibrating welding parameters (e.g., current waveform, force, time, a isolated gate bi-polar transisters, etc.). The controller may be configured to receive input signals (e.g., user initiation commands, programs, etc.) from the user interface, and to send control signals according to control criteria to the welding apparatus and output signals (e.g., signals representative of feedback information) to the user interface. The controller may be a hard-wired circuit, or may include a microprocessor, microcomputer, or programmable digital processor, with associated software, operating systems and/or any other associated programs to collectively implement the control program. According to alternative embodiments, the controller and its associated control program may be implemented in hardware, software, or a combination thereof, or in a central program implemented in any of a variety of forms. The controller may also be an integral programmable unit or circuit disposed in the inverter and includes one or more digital processors, or microprocessors or the like used to monitor and/or control welding systems and functions.

The parameters that may be selectively controlled may include force, current waveform, time, and other parameters that define the electrical or physical system would include particular geometric values of the various segments (such as sensor locations and segment lengths) along with values (which may be determined or measured empirically or experimentally) that describe the inertial and dynamic effects (such as delays, hydraulic or pneumatic dynamics, mass properties, etc.). These parameters would ordinary be calibrated and adjusted for a particular welding operation (or type of welder) to prevent interferences or other error conditions or invalid values and programmed or stored as control criteria.

When the control parameters are implemented in a software program, such values and ranges can be conventionally programmed into the control system to achieve desired or suitable control during the automated stowing process. According to alternative embodiments, the weld program may be provided through any of a variety of user input devices include a keypad, analog control dials, etc. According to other alternative embodiments, the current may be any of a variety of DC current waveforms.

According to an alternative embodiment, the welding system signals the actuator to move the electrodes so that a force is applied until a preselected force (Fp) is attained. When the preselected force (Fp) is attained, current flow is initiated by the control system (time $T_1$). As the current rises, the weld nugget forms at the interface until the preselected current is attained. After a preselected period of time ("weld time," preferably about 10–40 milliseconds ("ms") for a 20-gauge workpiece) current flow is ceased by the control system (time $T_2$). Applied force is maintained for a preselected period of time ("hold time" from $T_2$ to $T_3$).

According to an alternative embodiment, the welding system actuates the actuator system (e.g., a primary actuator) to provide a preselected force (Fp) to the workpieces based upon signals from the user interface. After the control system determines that the preselected force has been attained (e.g., based on a signal from a pressure sensor), the control system provides for a preselected current to be supplied to the electrodes. The current travels through the workpieces until a weld nugget is formed at an interface surface between the workpieces. The applied force is monitored by the control system based upon signals from the pressure sensor representative of force. Contact between the workpieces is maintained throughout the welding operation by actuation of a secondary actuator (e.g., a fast follow-up electrode, etc.). As a surface defect in the primary surface forms, the secondary actuator maintains contact with the workpieces. According to an exemplary embodiment, as the force deviates from the preselected force (Fp), the secondary actuator continues to maintain contact and (at about the same amount of force) as the weld nugget is formed.

According to an exemplary embodiment, one or more of the welding parameters may be adjusted in order to shift or position the weld nugget toward the secondary surface, such that the surface defect in the primary surface has a lesser depth than the surface defect in the secondary surface. According to an alternative embodiment, the welding system is configured to modify the force being applied to the workpieces (e.g., during specific points during the welding operation, as the surface defect forms, etc.) based on signals from the sensor that are representative of a force. The controller may also be electrically coupled to the transducer to monitor the values of other parameters and act to correct deviations from pre-set values. When the transducer measures a value outside a pre-set or pre-determined range, the controller sends a signal to the primary actuator (or the secondary actuator) to apply force to the weldment.

It is important to note that the terms "article of furniture" or "office furniture" are intended to be broad terms and not terms of limitation. Furniture, as used in this disclosure, may include, without limitation: systems furniture (e.g., partition wall systems, architectural walls, space frames, work stations, etc.), casegoods (e.g., file cabinets, storage bins, drawers, containers, closets, etc.), seating products (e.g., chairs, stools, lounges, etc.), worksurfaces (e.g., tables, desking systems, credenzas, etc.), lighting systems, accessories (e.g., computer trays, shelving systems, etc.). The resistance welding system may be used with any of a variety of workpieces and is not intended to be limited to use with office furniture. For example, the resistance welding system may be used, without limitation, in the medical (e.g., lab furniture, lab equipment, stainless hospital carts, operating trays, etc.), food (e.g., storage, vats for holding food product, trucking of food product, etc.), automotive, avionics, aerospace, admiralty, building, and consumer product industries, etc. and may also find application in elevator doors, household goods (e.g., kitchen cabinets, house exterior doors, etc.), appliances (e.g., stoves, refrigerator, microwaves, freezers, etc.) and other accessories.

It is also important to note that the terms "channel" and "branch" are intended to be broad terms and are not meant as terms of limitation, insofar as the structures described in this specification (or alternative and/or equivalent structures) may serve to provide for the flow of a fluid through a passage, chamber, tube, conduit, inlet, intake, outlet, discharge, port, etc.

It is also important to note that the construction and arrangement of the elements of the resistance welding system in the preferred and other exemplary embodiments is illustrative only. Although only a few embodiments of the present invention have been described in detail in this disclosure, those skilled in the art who review this disclosure will readily appreciate that many modifications are possible (e.g., variations in sizes, structures, shapes and proportions of the various elements, values of parameters, mounting arrangements, use of materials, orientations, etc.) without materially departing from the novel teachings and advantages of the subject matter recited in the claims. For example, any of a variety of methods of welding may be used with the welding system. Although the descriptions and FIGURES of the various welding systems are generally described with the workpieces in a horizontal plane, the workpieces can be in any plane of the axis of the electrode tip and the direction of the welding force are both generally normal to the workpieces. Moreover, the particular values of the signals and control program may vary within the spirit of the present invention from various types or configuration of worksurfaces for a variety of different types of welding operations, depending on particular static and dynamic characteristics presented. The order of steps may have any of a variety of sequences or other variations. The order of steps, for example, moving the weldhead, applying preselected force to the workpieces, supplying the preselected amount of current for a preselected amount of time, monitoring the force applied to the workpieces, maintaining the preselected amount of force applied to the workpieces, may also be varied or resequenced according to alternative embodiments of the invention. Accordingly, all such modifications are intended to be included within the scope of the invention as defined in the following claims. Other substitutions, modifications, changes and omissions may be made in the design, operating conditions and arrangement of the preferred embodiments without departing from the spirit of the invention as expressed in the appended claims. Accordingly, all such modifications are intended to be included within the scope of the invention as defined in the appended claims.

What is claimed is:

1. A resistance spot welding system comprising:
    a fast follow-up electrode of one RWMA class mounted to one end of a pivot arm for squeezing a primary workpiece and a secondary workpiece together and for following the surface of the secondary workpiece as the weld is formed;
    a stationary electrode of another RWMA class positioned opposite the fast follow-up electrode;
    a sensor coupled to the stationary electrode for directly measuring the contact force between the fast follow-up electrode and the stationary electrode;
    wherein the electrodes are configured for energizing the workpieces with a direct current.

2. The system of claim 1 wherein the depression formed in the primary surface is less than about −0.0008 inch.

3. The system of claim 2, further including visually determining whether the depression is substantially visible from a distance of greater than two feet.

4. The system of claim 1 further comprising a measuring instrument for measuring a depression formed in the primary surface.

5. The system of claim 1 wherein the first workpiece and the second workpiece are each substantially free of a welding projection.

6. The system of claim, 1 wherein the one RWMA class is RWMA class 2, and the another RWMA class is one of RWMA class 3 and RWMA class 4.

7. A method of resistance spot welding, comprising:
    providing a first workpiece having a use surface in an abutting relationship to a second workpiece having a concealed surface;
    positioning a first electrode of a first class in physical contact with the use surface;
    maintaining the first electrode in contact with the use surface;
    maintaining a second electrode of a second class in contact with the concealed surface;
    measuring a signal representative of at least one of a contact force between the electrodes and the workpieces or time; for at least a pre-selected amount of time or a pre-determined contact force value is exceeded;
    applying a pre-determined current by the electrodes for at least a pre-selected amount of time or a pre-determined contact force value is exceeded to form a weld nugget between the first workpiece and second workpiece;
    so that a lesser portion of the weld nugget is formed in the first workpiece and a greater portion of the weld nugget is formed in the second workpiece;
    wherein a depression formed on the use surface has a lesser depth than a depression formed on the concealed surface.

8. The method of claim 7 further comprising controlling the location of the weld nugget relative to the primary surface and the secondary surface.

9. The method of claim 8 wherein controlling the location of the weld nugget comprises controlling the growth of the heat affected zone.

10. The method of claim 9 wherein controlling the growth of the heat affected zone comprises using a first material composition for the first electrode and a second material composition for the second electrode.

11. The method of claim 10 wherein the first electrode is a first RWMA class and the second electrode is of a second RWMA class.

12. The method of claim 11 wherein the first electrode is RWMA class 2 and the second electrode is one of RWMA class 3 and RWMA class 4.

13. The method of claim 7 further comprising applying a coating to the primary surface without additional finishing steps on the depression between welding and applying the coating.

14. The method of claim 7 further comprising measuring contact force between the first electrode and the second electrode, wherein the current is initiated when the contact force reaches a preselected force value of less than about 400 lbs.

15. The method of claim 14 wherein the preselected force value is between 145 lbs. and 155 lbs.

16. The method of claim 7 wherein a negative direct current is applied through the second electrode.

17. The method of claim 7 further comprising varying at least one of the contact force, the current, or the weld time.

18. The method of claim 7 wherein the contact force is measured by a sensor.

19. The method of claim 18 wherein the sensor comprises a pressure transducer.

20. The method of claim 18 further comprising comparing the contact force to the preselected force.

21. The method of claim 20 further comprising adjusting the contact force so that it is proximate the preselected force.

22. The method of claim 7 wherein maintaining the position of the first electrode with the use surface or maintaining the second electrode of a second class in physical contact with the concealed surface comprises actuation of a secondary actuator.

23. The method of claim 22 wherein the secondary actuator comprises a fast follow-up cylinder or a fast follow-up holder.

24. An article of furniture providing a concealed surface having a greater depression and a use surface having a lesser depression that is not substantially visible to the unaided eye and produced by a processes of resistance spot welding, comprising:
    measuring a signal representative of a contact force of at least two electrodes of different classes against the use surface or the concealed surface;
    applying a pre-selected amount of current by the electrodes after a pre-determined contact force is exceeded;
    forming a lesser portion of a weld nugget in the first workpiece and a greater portion of the nugget in the second workpiece;
    wherein the greater depression in the concealed surface has a depth greater than the depth of the lesser depression in the use surface.

25. The method of claim 24 further comprising controlling the location of the weld nugget relative to the primary surface and the secondary surface.

26. The method of claim 25 wherein controlling the location of the weld nugget comprises controlling the growth of the heat affected zone so that a lesser portion of the nugget is formed in the first workpiece and a greater portion of the nugget is formed in the second workpiece.

27. The article of furniture of claim 26 further comprising controlling the location of the weld nugget by using at least two different material classes of electrodes.

28. The method of claim 27 wherein controlling the growth of the heat affected zone comprises using a first material composition for the first electrode and a second material composition for the second electrode.

29. The method of claim 28 wherein the first electrode is a first RWMA class and the second electrode is of a second RWMA class.

30. The method of claim 29 wherein the first electrode is RWMA class 2 and the second electrode is one of RWMA class 3 and RWMA class 4.

31. The article of furniture of claim 24 wherein a coating is applied to the primary surface without additional finishing steps on the depression between welding and applying the coating.

32. The article of furniture of claim 24 wherein measuring the signal comprises directly measuring the signal.

33. A method of resistance spot welding, comprising:
providing a first workpiece having a use surface in an abutting relationship to a second workpiece having a concealed surface;
positioning a first electrode of a first class in physical contact with the use surface;
maintaining the first electrode in contact with the use surface;
maintaining a second electrode of a second class in contact with the concealed surface;
measuring a signal representative of at least one of a contact force between the electrodes and the workpieces or time;
applying a pre-determined current by the electrodes for at least a pre-selected amount of time or a pre-determined contact force value is exceeded to form a weld nugget between the first workpiece and second workpiece;
controlling the growth of the weld nugget by using a first material composition for the first electrode and a second material composition for the second electrode at least two different classes of electrode material;
so that a lesser portion of the weld nugget is formed in the first workpiece and a greater portion of the weld nugget is formed in the second workpiece; and
wherein a depression formed on the use surface has a lesser depth than a depression formed on the concealed surface.

34. The method of claim 33 wherein controlling the growth of the weld nugget comprises controlling the location of the weld nugget relative to the primary surface and the secondary surface.

35. The method of claim 34 wherein the step of controlling the location of the weld nugget comprises controlling the growth of the heat affected zone so that a lesser portion of the nugget is formed in the first workpiece and a greater portion of the nugget is formed in the second workpiece.

36. The method of claim 35 further comprising controlling the growth of the heat affected zone by using a first material composition for the first electrode and a second material composition for the second electrode.

37. The method of claim 36 wherein the first electrode is a first RWMA class and the second electrode is of a second RWMA class.

38. The method of claim 37 wherein the first electrode is RWMA class 2 and the second electrode is one of RWMA class 3 and RWMA class 4.

39. The method of claim 33 further comprising applying a coating to the primary surface without additional finishing steps on the depression between welding and applying the coating.

40. The method of claim 33 further comprising measuring contact force between the first electrode and the second electrode, wherein the current is initiated when the contact force reaches a preselected force value of less than about 400 lbs.

41. The method of claim 40 wherein the preselected force value is between 145 lbs. and 155 lbs.

42. The method of claim 33 wherein the contact force is measured by a sensor.

43. The method of claim 42 wherein the sensor comprises a pressure transducer.

44. The method of claim 42 further comprising comparing the contact force to the preselected force.

45. The method of claim 33 further comprising adjusting the contact force so that it is proximate the preselected force.

46. The method of claim 45 wherein maintaining the position of the first electrode relative to the use surface or maintaining the second electrode of a second class and in physical contact with the concealed surface comprises actuation of a secondary actuator.

* * * * *